United States Patent
Yuki

(10) Patent No.: US 10,855,393 B2
(45) Date of Patent: Dec. 1, 2020

(54) TRANSMITTING DEVICE AND TRANSMISSION SYSTEM

(71) Applicant: FUJITSU LIMITED, Kawasaki (JP)

(72) Inventor: Masahiro Yuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/781,114

(22) Filed: Feb. 4, 2020

(65) Prior Publication Data

US 2020/0274633 A1    Aug. 27, 2020

(30) Foreign Application Priority Data

Feb. 25, 2019   (JP) .................. 2019-031482

(51) Int. Cl.
*H04B 10/54*  (2013.01)
*H04J 14/02*  (2006.01)
(Continued)

(52) U.S. Cl.
CPC ...... *H04J 14/0223* (2013.01); *H04J 14/0212* (2013.01); *H04J 14/0213* (2013.01); *H04Q 11/0005* (2013.01); *H04Q 2011/0047* (2013.01)

(58) Field of Classification Search
CPC .............. H04J 14/0223; H04J 14/0213; H04J 14/0212; H04J 14/00; H04Q 11/0005;
(Continued)

(56) References Cited

U.S. PATENT DOCUMENTS

| | | | |
|---|---|---|---|
| 5,005,166 A * | 4/1991 | Suzuki | H04J 14/00 398/47 |
| 6,404,940 B1 * | 6/2002 | Tsuyama | H04Q 11/0005 385/17 |

(Continued)

FOREIGN PATENT DOCUMENTS

| | | |
|---|---|---|
| EP | 1113613 A2 | 7/2001 |
| JP | 2001-086099 A | 3/2001 |
| JP | 2003-188830 A | 7/2003 |
| JP | 2015-171155 A | 9/2015 |

OTHER PUBLICATIONS

EESR—The Extended European Search Report of European Patent Application No. 201550993 dated Aug. 7, 2020. ** Reference US2002/0015551 listed in the EESR was previously cited by the Examiner on Aug. 5, 2020.

(Continued)

*Primary Examiner* — Abbas H Alagheband

(74) *Attorney, Agent, or Firm* — Fujitsu Patent Center

(57) ABSTRACT

A transmitting device, includes inputting a multiplex light multiplexed a first wavelength-multiplexed signal light stream in a first wavelength band and a second wavelength-multiplexed signal light stream in a second wavelength band; inputting a multiplex light multiplexed a third wavelength-multiplexed signal light stream in a first wavelength band and a fourth wavelength-multiplexed signal light stream in a second wavelength band; converting the first wavelength-multiplexed signal light stream to the second wavelength band; converting the third wavelength-multiplexed signal light stream to the second wavelength band; generating a first output signal light multiplexed by signal light in a first wavelength band among the multi-wavelength light so that wavelengths do not overlap; generating a second output signal light multiplexed by signal light in a second wavelength band among the multi-wavelength light so that wavelengths do not overlap; converting the first output signal light to the first wavelength band; and outputting the multiplexed light.

10 Claims, 23 Drawing Sheets

(51) Int. Cl.
  *H04B 10/548* (2013.01)
  *H04B 10/516* (2013.01)
  *H04B 10/50* (2013.01)
  *H04Q 11/00* (2006.01)
  *H04L 1/00* (2006.01)

(58) Field of Classification Search
  CPC .......... H04Q 2011/0047; H04B 10/079; H04B 10/17; H04B 10/572; H04B 10/66; H04B 10/2525
  USPC .......................................................... 398/75
  See application file for complete search history.

(56) References Cited

U.S. PATENT DOCUMENTS

| | | | | |
|---|---|---|---|---|
| 6,509,987 | B1 | 1/2003 | Hunziker et al. | |
| 6,532,091 | B1* | 3/2003 | Miyazaki | H04B 10/299 359/237 |
| 6,574,386 | B1* | 6/2003 | Sufleta | H04Q 11/0005 385/15 |
| 7,162,155 | B2* | 1/2007 | Handelman | H04Q 11/0005 370/235 |
| 8,625,996 | B2* | 1/2014 | Tanaka | H04B 10/516 398/161 |
| 8,849,113 | B2* | 9/2014 | Ooi | H04J 14/0212 398/48 |
| 8,948,593 | B2* | 2/2015 | Ooi | H04J 14/022 398/59 |
| 2002/0015551 | A1* | 2/2002 | Tsuyama | H04J 14/0217 385/17 |
| 2003/0193937 | A1* | 10/2003 | Beshai | H04Q 11/0005 370/372 |
| 2009/0274459 | A1* | 11/2009 | Takita | H04J 14/0212 398/48 |
| 2015/0256908 | A1 | 9/2015 | Zhu et al. | |
| 2018/0167139 | A1* | 6/2018 | Inoue | H04J 14/02 |

OTHER PUBLICATIONS

P. Zhang et al., "Comparison of Node Architectures for Elastic Optical Networks with Waveband Conversion", China Communications, China Institute of Communications, Piscataway, NJ, USA, vol. 10, No. 8, Aug. 1, 2013, pp. 77-87, XP011529920, ISSN: 1673-5447, DOI:10.1109/Cc.2013.6633747 [retrieved on Oct. 15, 2013] cited in EESR dated Aug. 7, 2020 for corresponding European Patent Application No. 20155099.3.

* cited by examiner

FIG. 9
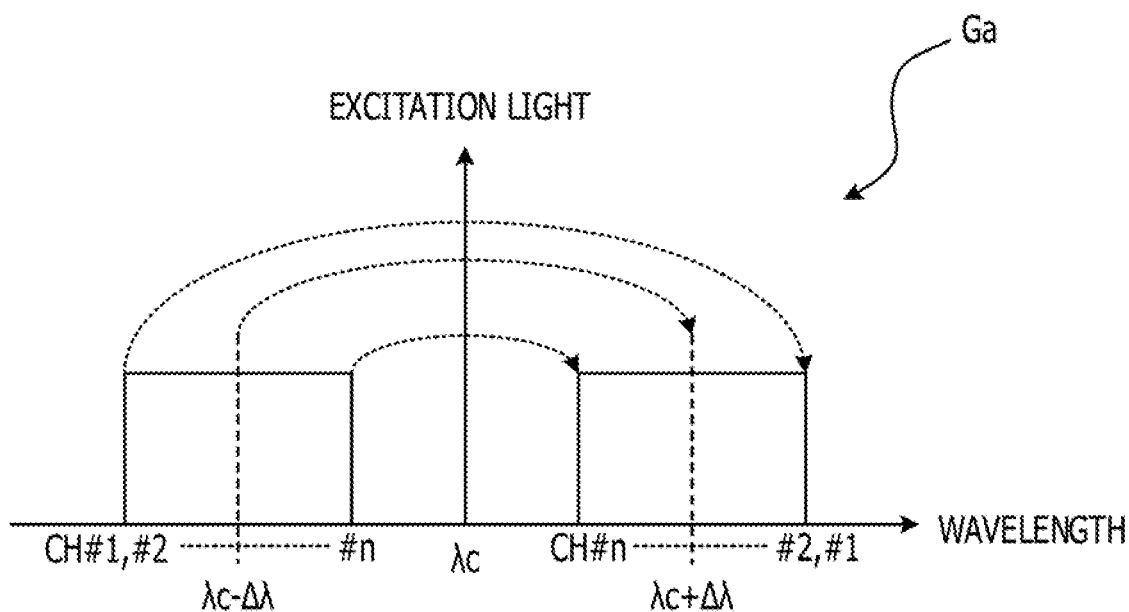
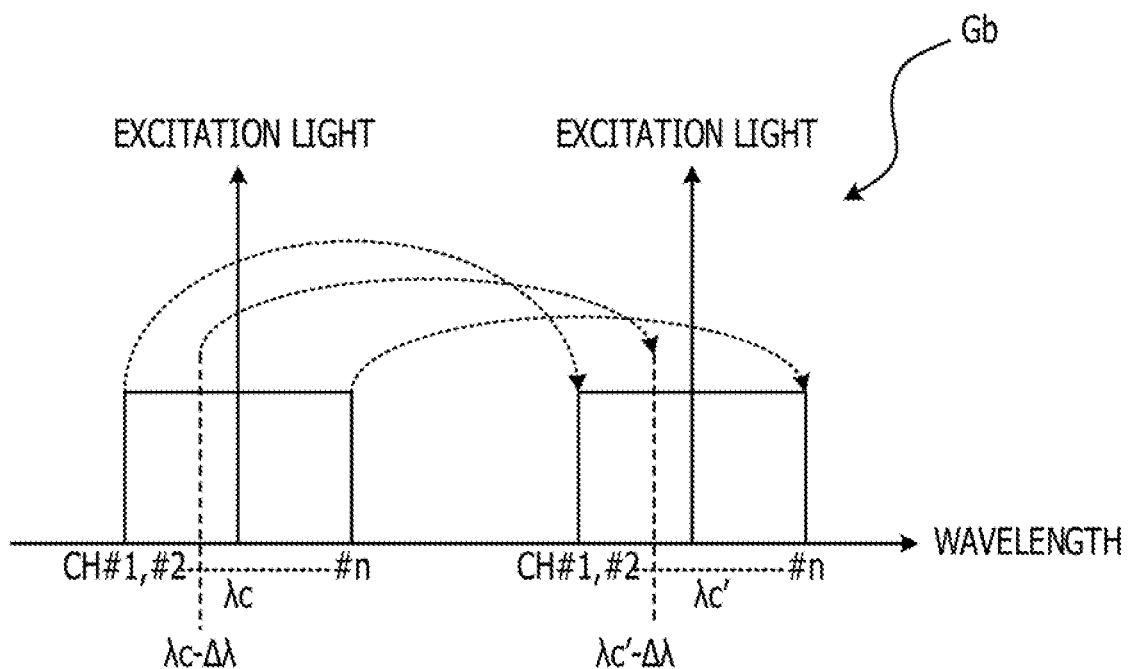

FIG. 11

| NODE #1/PORT P1in | | | TRANSMITTER | |
|---|---|---|---|---|
| WAVELENGTH BAND | CH | STATE | WAVELENGTH BAND | CH |
| C-BAND | 1 | 1 | C-BAND | 1 |
| | 2 | 1 | | 2 |
| | ... | ... | | ... |
| | 84 | 1 | | 84 |
| | 85 | 0 | - | - |
| | 86 | 0 | - | - |
| | 87 | 0 | - | - |
| | 88 | 0 | - | - |
| L-BAND | 1 | 1 | L-BAND | 1 |
| | 2 | 1 | | 2 |
| | ... | ... | | ... |
| | 84 | 1 | | 84 |
| | 85 | 1 | | 85 |
| | 86 | 1 | | 86 |
| | 87 | 1 | | 87 |
| | 88 | 1 | | 88 |

FIG. 12

| NODE #1/PORT P1in | | | TRANSMITTER | |
|---|---|---|---|---|
| WAVELENGTH BAND | CH | STATE | WAVELENGTH BAND | CH |
| C-BAND | 1 | 0 | - | - |
| | 2 | 0 | - | - |
| | ... | ... | ... | ... |
| | 84 | 0 | - | - |
| | 85 | 0 | - | - |
| | 86 | 0 | - | - |
| | 87 | 0 | - | - |
| | 88 | 0 | - | - |
| L-BAND | 1 | 0 | - | - |
| | 2 | 0 | - | - |
| | ... | ... | ... | ... |
| | 84 | 0 | - | - |
| | 85 | 1 | L-BAND | 85 |
| | 86 | 1 | | 86 |
| | 87 | 1 | | 87 |
| | 88 | 1 | | 88 |

FIG. 13

| NODE #1/PORT P1in | | | TRANSMITTER | |
|---|---|---|---|---|
| WAVELENGTH BAND | CH | STATE | WAVELENGTH BAND | CH |
| C-BAND | 1 | 1 | C-BAND | 1 |
| | 2 | 1 | | 2 |
| | ... | ... | | ... |
| | 84 | 1 | | 84 |
| | 85 | 1 | | 85 |
| | 86 | 1 | | 86 |
| | 87 | 1 | | 87 |
| | 88 | 1 | | 88 |
| L-BAND | 1 | 1 | L-BAND | 1 |
| | 2 | 1 | | 2 |
| | ... | ... | | ... |
| | 84 | 1 | | 84 |
| | 85 | 1 | | 85 |
| | 86 | 1 | | 86 |
| | 87 | 1 | | 87 |
| | 88 | 1 | | 88 |

FIG. 18

| WSS-ID | PORT ID | COUPLING DESTINATION PORT ID |
|---|---|---|
| 24c | b | 26c-d |
|  | c | 26d-d |
|  | k | 200-y |
| 25c | ... | ... |
| 24d | ... | ... |
| 25d | ... | ... |

131a

| WSS-ID | PORT ID | COUPLING DESTINATION PORT ID |
|---|---|---|
| 26c | d | 24c-b |
|  | e | 24d-b |
|  | f | 25c-b |
|  | g | 24d-b |
|  | i | 201-t |
| 26d | ... | ... |

131b

| MCS-ID | PORT ID | COUPLING DESTINATION PORT ID |
|---|---|---|
| 200 | v | 25d-d |
|  | w | 24d-d |
|  | x | 25c-d |
|  | y | 24c-d |
| 201 | t | 26c-i |
|  | u | 26d-i |

131c

131

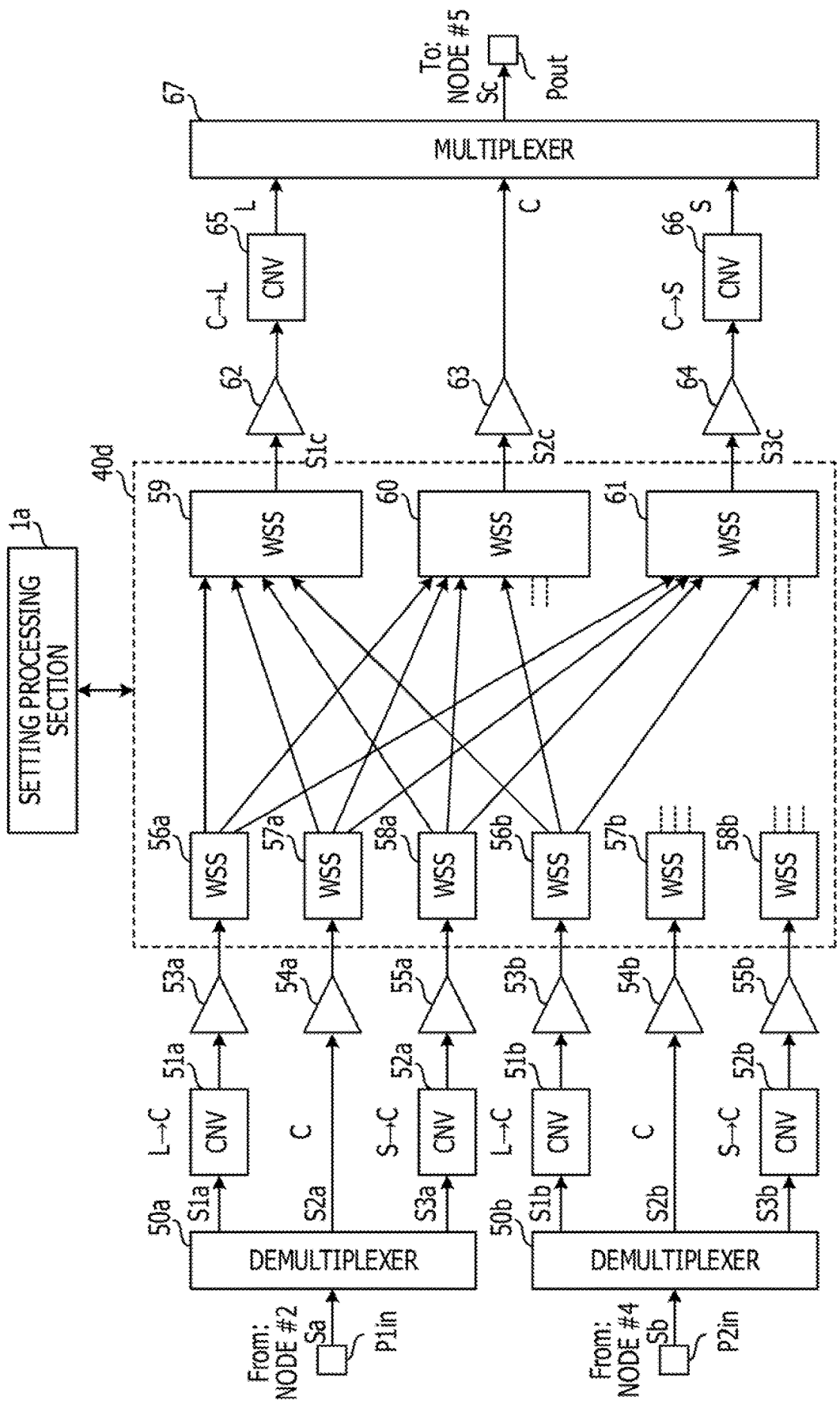

TRANSMITTING DEVICE AND TRANSMISSION SYSTEM

CROSS-REFERENCE TO RELATED APPLICATION

This application is based upon and claims the benefit of priority of the prior Japanese Patent Application No. 2019-31482, filed on Feb. 25, 2019, the entire contents of which are incorporated herein by reference.

FIELD

The embodiments discussed herein are related to a transmitting device and a transmission system.

BACKGROUND

With an increase in demand for communication, an increase in a transmission capacity for Wavelength Division Multiplexing (WDM) is requested. For example, when only a wavelength-multiplexed signal light stream in the conventional band (C-band) is transmitted, the wavelength band is limited to a range of 1530 nm to 1565 nm.

Thus, for example, it is considered that the transmission capacity for WDM is increased by expanding the wavelength band to the long band (L-band) of 1565 nm to 1625 nm or the short band (S-band) of 1460 nm to 1530 nm. For example, Japanese Laid-open Patent Publication No. 2003-188830 describes a technique for converting wavelength-multiplexed signal light streams in the C-band into wavelength-multiplexed signal light streams in the L- and S-bands, multiplexing the wavelength-multiplexed signal light streams in the C-, L-, and S-bands, and transmitting the wavelength-multiplexed signal light streams.

SUMMARY

According to an aspect of the embodiments, a transmitting device, includes a first input port configured to input first input signal light obtained by multiplexing a first wavelength-multiplexed signal light stream in a first wavelength band with a second wavelength-multiplexed signal light stream in a second wavelength band is input; a second input port configured to input second input signal light obtained by multiplexing a third wavelength-multiplexed signal light stream in the first wavelength band with a fourth wavelength-multiplexed signal light stream in the second wavelength band is input; a first wavelength converter that converts the wavelength band of the first wavelength-multiplexed signal light stream from the first wavelength band to the second wavelength band; a second wavelength converter configured to convert the wavelength band of the third wavelength-multiplexed signal light stream from the first wavelength band to the second wavelength band; a generator configured to generate first output signal light by wavelength-multiplexing first multi-wavelength light in the first wavelength band among multi-wavelength light included in the first wavelength-multiplexed signal light stream in the wavelength band converted by the first wavelength converter, the second wavelength-multiplexed signal light stream, the third wavelength-multiplexed signal light stream in the wavelength band converted by the second wavelength converter, and the fourth wavelength-multiplexed signal light stream so that wavelengths do not overlap each other, and generates second output signal light by wavelength-multiplexing second multi-wavelength light in the second wavelength band among the multi-wavelength light included in the first wavelength-multiplexed signal light stream in the wavelength band converted by the first wavelength converter, the second wavelength-multiplexed signal light stream, the third wavelength-multiplexed signal light stream in the wavelength band converted by the second wavelength converter, and the fourth wavelength-multiplexed signal light stream so that wavelengths do not overlap each other; a third wavelength converter configured to convert the wavelength band of the first output signal light from the second wavelength band to the first wavelength band; a first multiplexer configured to generate multiplexed light by multiplexing the first output signal light in the wavelength band converted by the third wavelength converter with the second output signal light; and an output port configured to output the multiplexed light.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a spectrum diagram describing an example of a wavelength conversion method by degenerate four-wave mixing and a wavelength conversion method by non-degenerate four-wave mixing;

FIG. 11 is a diagram illustrating an example of a channel setting database for an input port;

FIG. 12 is a diagram illustrating an example of a channel setting database for an input port;

FIG. 13 is a diagram illustrating an example of a channel setting database for an output port;

FIG. 18 is a diagram illustrating an example of a coupling configuration database;

FIG. 23 is a configuration diagram illustrating an example of a transmitting device for multiplexing wavelength-multiplexed signal light streams in the L-, C-, and S-bands.

DESCRIPTION OF EMBODIMENTS

For example, regarding a node that relays multiplexed light obtained by multiplexing wavelength-multiplexed signal light streams in the C- and L-bands, an adjacent node that is on a certain relay line and is a transmission destination of a wavelength-multiplexed signal light stream in the L-band may be the same as an adjacent node that is on another relay line and is a transmission destination of a wavelength-multiplexed signal light stream in the L-band. In this case, when each wavelength light included in a certain one of the wavelength-multiplexed signal light streams is able to be contained in a channel (hereinafter referred to as "available channel") not containing wavelength light included in the other of the wavelength-multiplexed signal light streams, the wavelength-multiplexed signal light streams may be wavelength-multiplexed into a single wavelength-multiplexed signal light stream, and the single wavelength-multiplexed signal light stream may be relayed.

However, when an available channel able to contain each wavelength light included in a wavelength-multiplexed signal light stream does not exist for any wavelength-multiplexed signal light stream, the wavelength-multiplexed signal light streams may not be multiplexed. Thus, for example, a relay line for the other wavelength-multiplexed signal light stream is to be changed to another relay line not extending through the corresponding node, and relay line selection is limited. Therefore, for example, there may be a disadvantage that the shortest relay line is not selected.

In the foregoing case, when nodes adjacent to each other are coupled to each other via multiple transmission lines (for example, multiple optical fiber cores), the wavelength-multiplexed signal light streams may be relayed in the respective transmission lines, but there is a problem that the cost of installing the transmission lines is higher, compared with the case where a single transmission line is installed. Under the foregoing circumstances, it is desirable to improve flexibility in selection of a relay line for a wavelength-multiplexed signal light stream.

Figure 1:
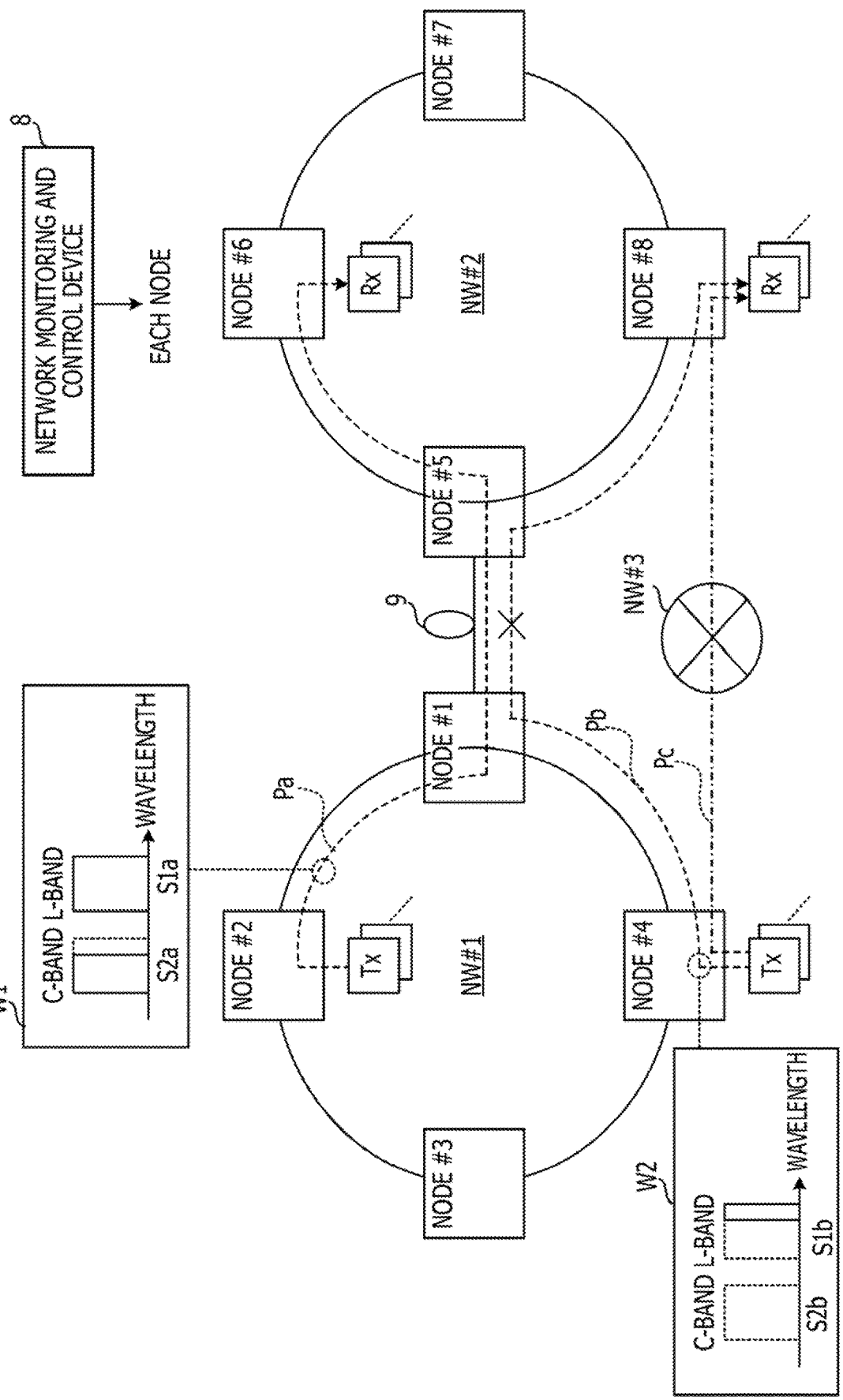
FIG. 1 is a diagram illustrating a transmission method according to a comparative example.

FIG. 1 is a diagram illustrating a transmission method according to a comparative example. Two ring-shaped networks NW #1 and NW #2 are exemplified. Nodes #1 to #4 coupled to each other in a ring are included in the network NW #1, while nodes #5 to #8 coupled to each other in a ring are included in the network NW #2.

The node #1 of the network NW #1 and the node #5 of the network NW #2 are coupled to each other via a transmission line 9. The networks NW #1 and NW #2 communicate with each other via the nodes #1 and #5. Each of the nodes #1 to #8 includes a transmitting device that transmits wavelength-multiplexed signal light streams in multiple wavelength bands.

A network monitoring and control device 8 is, for example, a network element operating system (NE-OpS) and monitors and controls the transmitting devices of the nodes #1 to #8. The network monitoring and control device 8 sets a path Pa in the networks NW #1 and NW #2 as an example. The path Pa extends through the nodes #2, #1, #5, and #6 in this order.

Multiple transmitters Tx of the node #2 transmit wavelength light of multiple different wavelengths. The transmitting device of the node #2 generates a wavelength-multiplexed signal light stream S1$a$ in the L-band and a wavelength-multiplexed signal light stream S2$a$ in the C-band by wavelength-multiplexing multi-wavelength light and transmits, in accordance with the path Pa, multiplexed light obtained by multiplexing the wavelength-multiplexed signal light streams S1$a$ and S2$a$.

Multiple channels containing wavelength light are allocated to the wavelength-multiplexed signal light stream S1$a$, while multiple channels containing wavelength light is allocated to the wavelength-multiplexed signal light stream S2$a$. Thus, the wavelength-multiplexed signal light streams S1$a$ and S2$a$ may include large amounts of data based on the numbers of channels.

A reference symbol W1 indicates an example of the spectrum of the multiplexed light, transmitted by the transmitting device of the node #2, of the wavelength-multiplexed signal light streams S1$a$ and S2$a$. For example, it is assumed that 90 channels are allocated to the wavelength-multiplexed signal light stream S1$a$ and 90 channels are allocated to the wavelength-multiplexed signal light stream S2$a$. Wavelength light of the wavelength-multiplexed signal light stream S2$a$ is contained in 80 channels among the 90 channels, while the remaining 10 channels are available channels (refer to dotted lines) not containing wavelength light.

The wavelength-multiplexed signal light streams S1$a$ and S2$a$ are transmitted to the node #6 through the nodes #1 and #5. The transmitting device of the node #6 separates the wavelength-multiplexed signal light streams S1$a$ and S2$a$ from the multiplexed light and separates the wavelength light from the wavelength-multiplexed signal light streams S1$a$ and S2$a$. Multiple receivers Rx of the node #6 receive the wavelength light.

The network monitoring and control device 8 sets a new path Pb after setting the path Pa. The path Pb extends through the nodes #4, #1, #5, and #8 in this order. Thus, the path Pb overlaps the path Pa in a relay section between the nodes #1 and #5.

Multiple transmitters Tx of the node #4 transmit multi-wavelength light of different wavelengths. The transmitting device of the node #4 multiplexes the multi-wavelength light to generate a wavelength-multiplexed signal light stream S1$b$ in the L-band and a wavelength-multiplexed signal light stream S2$b$ in the C-band and transmits, in accordance with the path Pb, multiplexed light obtained by multiplexing the wavelength-multiplexed signal light streams S1$b$ and S2$b$.

A reference symbol W2 indicates an example of the spectrum of the multiplexed light, transmitted by the transmitting device of the node #4, of the wavelength-multiplexed signal light streams S1$b$ and S2$b$. For example, it is assumed that 90 channels are allocated to the wavelength-multiplexed signal light stream S1b and 90 channels are allocated to the wavelength-multiplexed signal light stream S2b. As an example, the channels allocated to the wavelength-multiplexed signal light stream S2b are available, while wavelength light of the wavelength-multiplexed signal light stream S1b is contained in 10 channels.

The transmitting device of the node #1 relays multiplexed light obtained by multiplexing the wavelength-multiplexed signal light streams S1a and S1b to the node #5 through the single transmission line 9 (for example, a single optical fiber core). Thus, to relay the wavelength-multiplexed signal light streams S1b and S2b input from the node #4 via the path Pb to the node #5, it is requested that the transmitting device of the node #1 multiplex the wavelength-multiplexed signal light stream S1b with the wavelength-multiplexed signal light stream S1a of the path Pa.

However, since an available channel does not exist for the wavelength-multiplexed signal light stream S1a, the wavelength light for 10 channels that is included in the wavelength-multiplexed signal light stream S1b in the same L-band as the wavelength-multiplexed signal light stream S1a is not wavelength-multiplexed with the wavelength-multiplexed signal light stream S1a. Thus, the transmitting device of the node #1 does not set the path Pb (refer to X).

Therefore, the network monitoring and control device 8 sets, as a relay line for the wavelength-multiplexed signal light streams S2a and S2b, a path Pc extending from the node #4 to the node #8 via a network NW #3, for example. However, when a transmission distance of the path Pc is longer than that of the path Pb, the quality of the transmission of the wavelength-multiplexed signal light streams S2a and S2b may decrease, compared to the case where the path Pb is used as a relay line.

The new path Pb may not be set depending on an available channel for the wavelength-multiplexed signal light streams S1a and S1b to be relayed in accordance with the set path Pa, and path selection may be limited.

In embodiments, the wavelength band of the wavelength-multiplexed signal light streams S2a and S2b of the path Pb to be newly set is converted into a wavelength band of a wavelength-multiplexed signal light stream that is among the wavelength-multiplexed signal light streams S1a and S1b of the set path Pa and for which an available slot exists, and the conversion enables the wavelength-multiplexed signal light streams S2a and S2b to be wavelength-multiplexed with the wavelength-multiplexed signal light streams S1a and S1b. In the embodiments, a network monitoring and control device 8 may set the path Pb, and flexibility in path setting may be improved.

Figure 2:
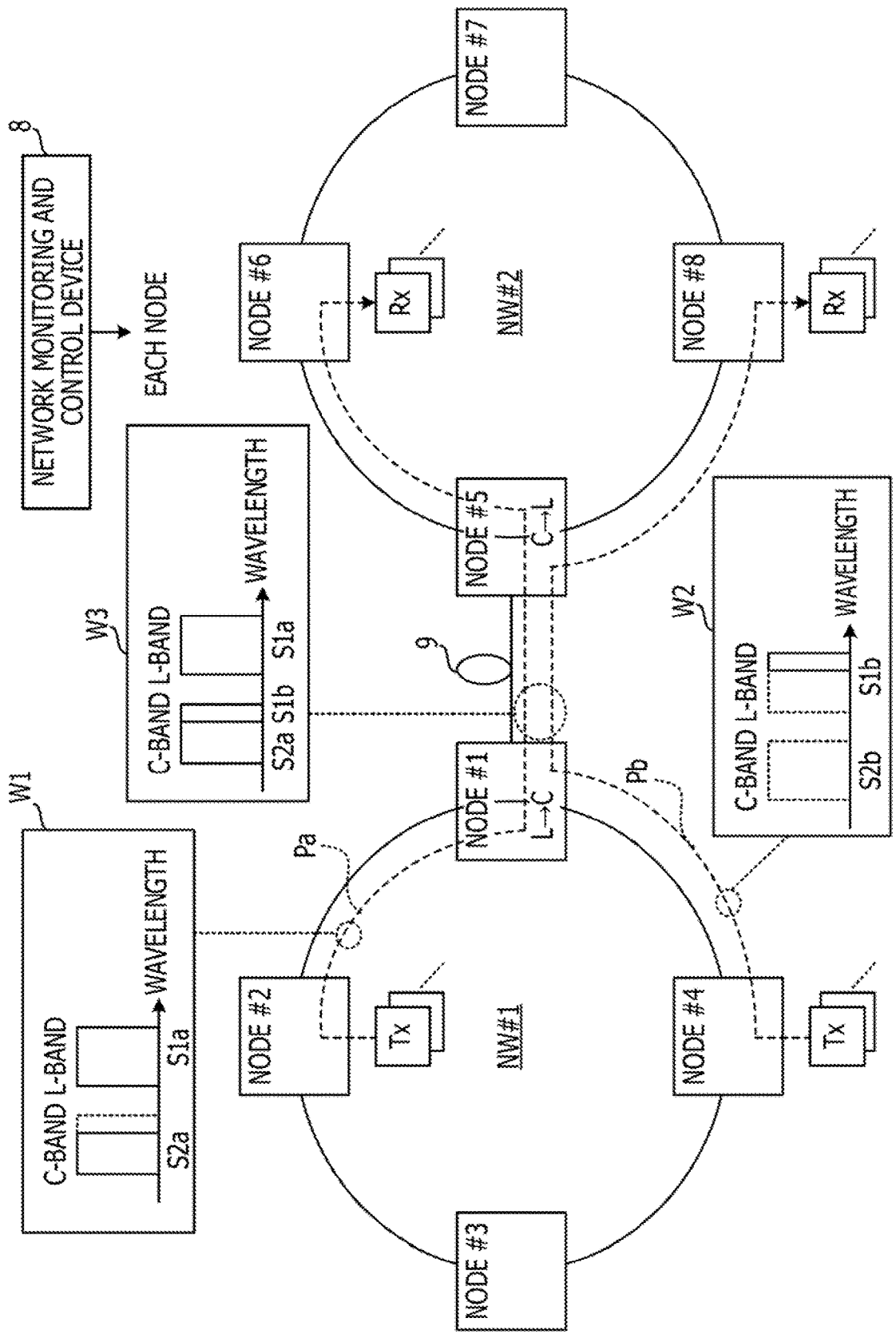
FIG. 2 is a diagram illustrating a transmission method according to embodiments.

FIG. 2 is a diagram illustrating a transmission method according to the embodiments; Configurations illustrated in FIG. 2 and common to those illustrated in FIG. 1 are indicated by the same reference symbols as those illustrated in FIG. 1 and are not described below.

A reference symbol W3 indicates an example of the spectrum of multiplexed light, transmitted by a transmitting device of a node #1, of the wavelength-multiplexed signal light streams S1a, S2a, and S1b. The transmitting device of the node #1 converts the wavelength band of the wavelength-multiplexed signal light stream S1b of the path Pb from the L-band to the C-band. The transmitting device of the node #1 wavelength-multiplexes the wavelength-multiplexed signal light stream S1b in the C-band with the C-band wavelength-multiplexed signal light stream S1a received from a node #2. Since wavelength light is not included in the wavelength-multiplexed signal light stream S2b in the C-band, the conversion of the wavelength band of the wavelength-multiplexed signal light stream S2b and the wavelength multiplexing of the wavelength-multiplexed signal light stream S2b are not executed.

The transmitting device of the node #1 generates multiplexed light by multiplexing the wavelength-multiplexed signal light stream S1a in the L-band with the wavelength-multiplexed signal light streams S1b and S2a in the C-band and transmits the generated multiplexed light to a transmitting device of a node #5. The transmitting device of the node #5 demultiplexes the wavelength-multiplexed signal light stream S1a in the L-band and the wavelength-multiplexed signal light streams S1b and S2a in the C-band from the multiplexed light. The transmitting device of the node #5 multiplexes the wavelength-multiplexed signal light stream S1a in the L-band with the wavelength-multiplexed signal light stream S2a in the C-band to generate multiplexed light and relays the multiplexed light to a node #6 in accordance with the path Pa.

The transmitting device of the node #5 converts the wavelength band of the wavelength-multiplexed signal light stream S1b from the C-band to the L-band and relays the wavelength-multiplexed signal light stream S1b in the L-band to a node #8. Thus, the wavelength-multiplexed signal light stream S2b is relayed from the node #4 to the node #8 in accordance with the path Pb. This example describes the case where the wavelength-multiplexed signal light stream S1b in the L-band is wavelength-multiplexed with the wavelength-multiplexed signal light stream S2a in the C-band, but the wavelength multiplexing is not limited to this. The wavelength-multiplexed signal light stream S2b in the C-band may be wavelength-multiplexed with the wavelength-multiplexed signal light stream S2a in the C-band.

Each of the transmitting devices of the nodes #1 to #8 includes wavelength converters and wavelength selective switches (WSSs) for each of routes, while ports of the WSSs for each of the routes are cross-coupled to each other. Thus, the transmitting devices may wavelength-multiplex the wavelength-multiplexed signal light streams S1a, S2a, S1b and S2b, input from the routes, in an arbitrary wavelength band and transmit the wavelength-multiplexed signal light streams S1a, S2a, S1b and S2b.

(Wavelength Converters)

Each of the wavelength converters converts the wavelength band of a wavelength-multiplexed signal light stream from the C-band to the L-band or from the L-band to the C-band. An example of each of the wavelength converters is described below.

Figure 3:
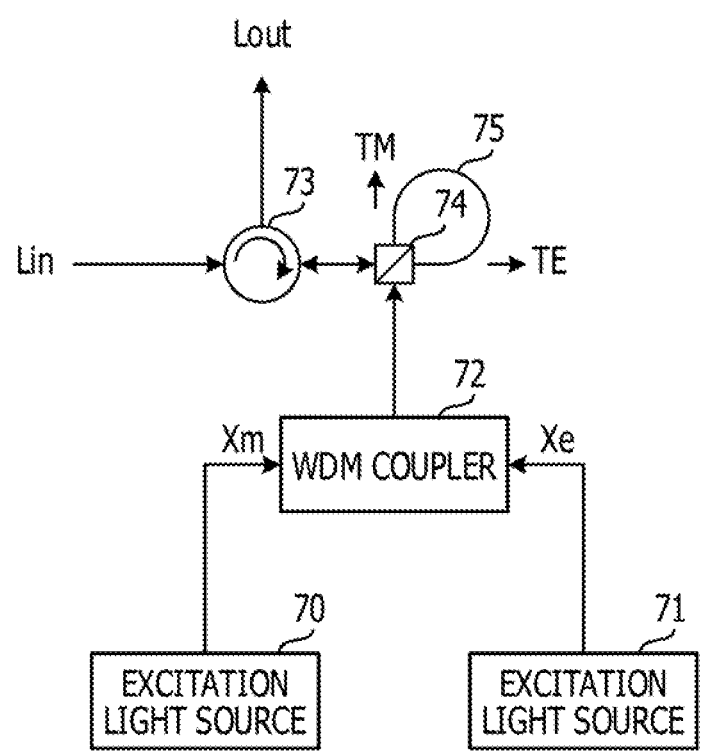
FIG. 3 is a configuration diagram illustrating an example of a wavelength converter.

FIG. 3 is a configuration diagram illustrating an example of the wavelength converter. Each of the wavelength converters includes a WDM coupler 72, excitation light sources 70 and 71, an optical circulator 73, a polarized beam splitter 74, and a highly non-linear fiber (HNLF) 75.

A wavelength-multiplexed signal light stream that is input to the wavelength converter is hereinafter referred to as input light Lin. A wavelength-multiplexed signal light stream that is output from the wavelength converter is hereinafter referred to as output light Lout.

The excitation light sources 70 and 71 output excitation light Xm and Xe to the WDM coupler 72. A polarized wave of the excitation light Xm and a polarized wave of the excitation light Xe are orthogonal to each other. The WDM coupler 72 wavelength-multiplexes the excitation light Xm and the excitation light Xe and outputs the excitation light Xm and the excitation light Xe to the polarized beam splitter 74. The input light Lin passes through the optical circulator 73 and is input to the polarized beam splitter 74.

The polarized beam splitter 74 is coupled to both ends of the highly non-linear fiber 75. The highly non-linear fiber 75 has two main axes. A TE polarized wave output port of the polarized beam splitter 74 is coupled to one of the ends of the highly non-linear fiber 75 at an angle matching one of the main axes. A TM polarized wave output port of the polarized beam splitter 74 is coupled to the other end of the highly non-linear fiber 75 at the angle matching the same axis.

The excitation light Xm and Xe and the input light Lin are separated into a TE polarized wave and a TM polarized wave by the polarized beam splitter 74. The TE polarized wave is input to the end, coupled to the TE polarized wave output port of the polarized beam splitter 74, of the highly non-linear fiber 75 and is input to the polarized beam splitter 74 again from the other end of the highly non-linear fiber 75. The TM polarized wave is input to the end, coupled to the TM polarized wave output port of the polarized beam splitter 74, of the highly non-linear fiber 75 and is input to the polarized beam splitter 74 again from the other end of the highly non-linear fiber 75.

The highly non-linear fiber 75 causes four-wave mixing (FWM) of the excitation light Xm and Xe and the input light Lin. Idler light caused by the four-wave mixing has a wavelength corresponding to a difference between wavelengths of the excitation light Xm and Xe and the input light Lin. The idler light is output from the highly non-linear fiber 75, passes through the polarized beam splitter 74, and is input to the optical circulator 73. The idler light is output as the output light Lout from the optical circulator 73.

Thus, the wavelength band of the wavelength-multiplexed signal light stream is converted between the C-band and the L-band. Therefore, the transmitting devices according to the embodiments may wavelength-multiplex the wavelength-multiplexed signal light streams S1a, S2a, S1b, and S2b in the different wavelength bands. The wavelength converter described in the foregoing example uses non-degenerate four-wave mixing with the excitation light Xm and Xe. However, a wavelength converter that use degenerate four-wave mixing with single excitation light may be used.

Next, a configuration example of each of the transmitting devices is described.

(Transmitting Device of Node #1 According to First Embodiment)

Figure 4:
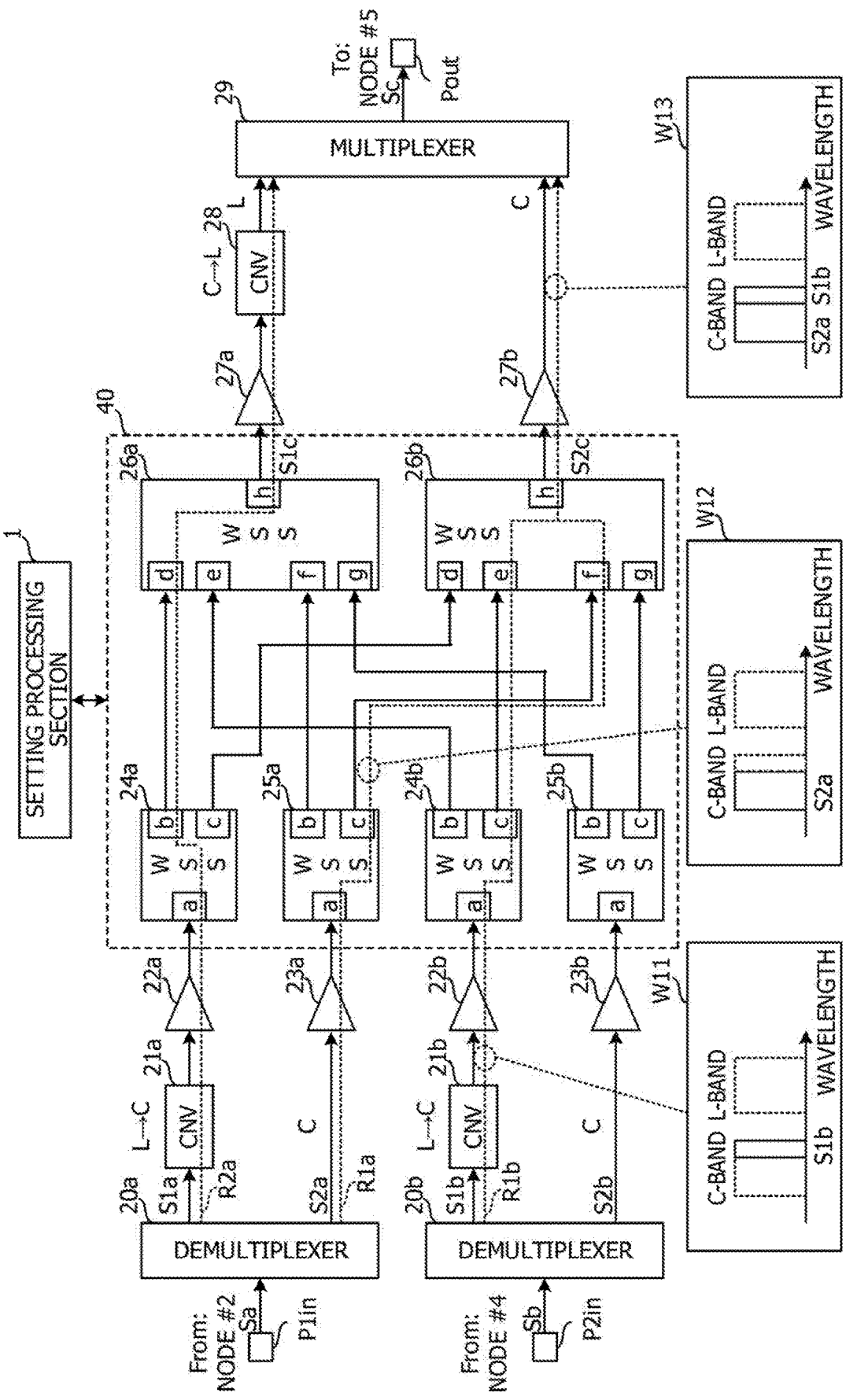
FIG. 4 is a configuration diagram illustrating a transmitting device of a node according to a first embodiment.

FIG. 4 is a configuration diagram illustrating the transmitting device of the node #1 according to a first embodiment. The transmitting device of the node #1 is an example of a first transmitting device and includes input ports P1in and P2in, an output port Pout, a setting processing section 1, demultiplexers 20a and 20b, wavelength converters (CNVs) 21a, 21b, and 28, optical amplifiers 22a, 22b, 23a, 23b, 27a, and 27b, a wavelength multiplexer 40, and a multiplexer 29. Each of the wavelength converters 21a, 21b, 28 has the configuration illustrated in FIG. 3, for example.

FIG. 4 illustrates a configuration for executing a relay process on the paths Pa and Pb illustrated in FIG. 2. FIG. 4 illustrates the configuration related to the process to be executed on the wavelength-multiplexed signal light streams S1a, S2a, S1b, and S2b that are input and output from and to routes between the nodes #2, #4, and #5.

The input port P1in is coupled to the transmitting device of the node #2. The input port P2in is coupled to the transmitting device of the node #4. Multiplexed light Sa obtained by multiplexing the wavelength-multiplexed signal light stream S1a in the L-band with the wavelength-multiplexed signal light stream S2a in the C-band is input to the input port P1in from the node #2. Multiplexed light Sb obtained by multiplexing the wavelength-multiplexed signal light stream S1b in the L-band with the wavelength-multiplexed signal light stream S2b in the C-band is input to the input port P2in from the node #4.

Each of the input ports P1in and P2in includes an optical coupler coupled to the transmission line, for example. The input port P1in is an example of a first input port. The input port P2in is an example of a second input port. The multiplexed light Sa is an example of first input signal light. The multiplexed light Sb is an example of second input signal light.

The multiplexed light Sa is input to the demultiplexer 20a from the input port P1in. The demultiplexer 20a demultiplexes the wavelength-multiplexed signal light streams S1a and S2a from the multiplexed light Sa. The wavelength-multiplexed signal light stream S1a is an example of a first wavelength-multiplexed signal light stream. The wavelength-multiplexed signal light stream S2a is an example of a second wavelength-multiplexed signal light stream. The L-band is an example of a first wavelength band. The C-band is an example of a second wavelength band.

The multiplexed light Sb is input to the demultiplexer 20b from the input port P21n. The demultiplexer 20b demultiplexes the wavelength-multiplexed signal light streams S1b and S2b from the multiplexed light Sb. The wavelength-multiplexed signal light stream S1b is an example of a third wavelength-multiplexed signal light stream. The wavelength-multiplexed signal light stream S2b is an example of a fourth wavelength-multiplexed signal light stream. The demultiplexers 20a and 20b are, for example, optical filters or optical splitters.

The wavelength-multiplexed signal light stream S1a is input to the wavelength converter 21a from the demultiplexer 20a. The wavelength converter 21a converts the wavelength band of the wavelength-multiplexed signal light stream S1a from the L-band to the C-band. Thus, the wavelength-multiplexed signal light stream S1a may be processed by an inexpensive optical component that supports the C-band. The wavelength converter 21a is an example of a first wavelength converter.

The wavelength-multiplexed signal light stream S1a is input to the optical amplifier 22a from the wavelength converter 21a and amplified by the optical amplifier 22a. The wavelength-multiplexed signal light stream S2a is input to the optical amplifier 23a from the demultiplexer 20a and amplified by the optical amplifier 23a.

The wavelength-multiplexed signal light stream S1b is input to the wavelength converter 21b from the demultiplexer 20b. The wavelength converter 21b converts the wavelength band of the wavelength-multiplexed signal light stream S1b from the L-band to the C-band. Thus, the wavelength-multiplexed signal light stream S1b may be processed by an inexpensive optical component that supports the C-band. The wavelength converter 21b is an example of a second wavelength converter.

The wavelength-multiplexed signal light stream S1b is input to the optical amplifier 22b from the wavelength converter 21b and amplified by the optical amplifier 22b. The wavelength-multiplexed signal light stream S2b is input to the optical amplifier 23b from the demultiplexer 20a and amplified by the optical amplifier 23a.

The wavelength-multiplexed signal light streams S1a, S2a, S1b, and S2b are input to the wavelength multiplexer 40 from the optical amplifiers 22a, 23a, 22b, and 23b.

The wavelength multiplexer 40 includes multiple wavelength selective switches so that each wavelength light included in the wavelength-multiplexed signal light streams input from the input source nodes is output to output destination nodes corresponding to destinations of the wavelength light. As the wavelength selective switches, wavelength selective switches (hereinafter referred to as "Input-side WSSs") that separate each wavelength light from wavelength-multiplexed signal light streams for each wavelength light are installed for the input source nodes, and wavelength selective switches (hereinafter referred to as "output-side WSSs") that wavelength-multiplex the wavelength light from the input source nodes are installed for an output destination node.

The wavelength multiplexer 40 includes the input-side WSSs 24a, 24b, 25a, and 25b and the output-side WSSs 26a and 26b. The input-side WSSs 24a and 25b correspond to the node #2. The input-side WSSs 24b and 25b correspond to the node #4. The output-side WSSs 26a and 26b correspond to the node #5. An input-side WSS corresponding to the node #5 and output-side WSSs corresponding to the nodes #2 and #4 are also included in the wavelength multiplexer 40, but are not illustrated to simplify the following description.

Each of the input-side WSSs 24a, 24b, 25a, and 25b includes ports a to c, while each of the output-side WSSs 26a and 26b includes ports d to h. The wavelength-multiplexed signal light streams S1a, S2a, S1b, and S2b are input to the ports a of the input-side WSSs 24a, 24b, 25a, and 25b from the optical amplifiers 22a, 23a, 22b, and 23b. The input-side WSSs 24a, 24b, 25a, and 25b separate the wavelength light from the wavelength-multiplexed signal light streams S1a, S2a, S1b, and S2b and output the wavelength light from the ports b and c. In this case, the wavelength light is wavelength-multiplexed for each of the ports b and c.

The wavelength-multiplexed wavelength light is input to the ports d to g of the output-side WSSs 26a and 26b. Each of the output-side WSSs 26a and 26b temporarily separates the wavelength light input from the ports d to g, wavelength-multiplexes the wavelength light into a single wavelength-multiplexed signal light stream S1c or S2c, and outputs the single wavelength-multiplexed signal light stream S1c or S2c from the port h. The wavelength-multiplexed signal light stream S1c is an example of first output signal light. The wavelength-multiplexed signal light stream S2c is an example of second output signal light.

Each of the input-side WSSs 24a, 24b, 25a, and 25b is coupled to the output-side WSSs 26a and 26b. Thus, the input-side WSSs 24a, 24b, 25a, and 25b are cross-coupled to the output-side WSSs 26a and 26b.

The port b of the input-side WSS 24a is coupled to the port d of the output-side WSS 26a. The port c of the input-side WSS 24a is coupled to the port d of the output-side WSS 26b. The port b of the input-side WSS 25a is coupled to the port f of the output-side WSS 26a. The port c of the input-side WSS 25a is coupled to the port f of the output-side WSS 26b.

The port b of the input-side WSS 24b is coupled to the port e of the output-side WSS 26a. The port c of the input-side WSS 24b is coupled to the port e of the output-side WSS 26b. The port b of the input-side WSS 25b is coupled to the port g of the output-side WSS 26a. The port c of the input-side WSS 25b is coupled to the port g of the output-side WSS 26b.

In the coupling configuration, the input-side WSS 24a outputs the wavelength light included in the wavelength-multiplexed signal light stream S1a to any of the output-side wavelength selective switches 26a and 26b, and the input-side WSS 25a outputs the wavelength light included in the wavelength-multiplexed signal light stream S2a to any of the output-side wavelength selective switches 26a and 26b. The input-side WSS 24b outputs the wavelength light included in the wavelength-multiplexed signal light stream S1b to any of the output-side wavelength selective switches 26a and 26b. The input-side WSS 25b outputs the wavelength light included in the wavelength-multiplexed signal light stream S2b to any of the output-side wavelength selective switches 26a and 26b. The input-side WSS 24a is an example of a third wavelength selective switch. The input-side WSS 25a is an example of a fourth wavelength selective switch. The input-side WSS 24b is an example of a fifth wavelength selective switch. The input-side WSS 25b is an example of a sixth wavelength selective switch.

The output-side WSS 26a generates the wavelength-multiplexed signal light stream S1c by wavelength-multiplexing the wavelength light input from the ports d to g. The output-side WSS 26b generates the wavelength-multiplexed signal light stream S2c by wavelength-multiplexing the wavelength light input from the ports d to g of the output-side WSS 26b. The output-side WSS 26a is an example of a first wavelength selective switch. The output-side WSS 26b is an example of a second wavelength selective switch.

Thus, each of the output-side WSSs 26a and 26b may wavelength-multiplex each wavelength light included in the wavelength-multiplexed signal light streams S1a, S1b, S2a, and S2b into any of the wavelength-multiplexed signal light streams S1c and S2c. In this case, the wavelength band of the wavelength-multiplexed signal light streams S1a and S1b is converted by the wavelength converters 21a and 21b into the C-band that is the same as the wavelength band of the wavelength-multiplexed signal light streams S2a and S2b.

Thus, the output-side WSSs 26a and 26b may wavelength-multiplex each wavelength light of the wavelength-multiplexed signal light streams S1a, S1b, S2a, and S2b in the common C-band. The wavelength light input to the output-side WSS 26a among the wavelength light of the wavelength-multiplexed signal light streams S1a, S2a, S1b, and S2b is an example of first multi-wavelength light. The wavelength light input to the output-side WSS 26b among the wavelength light of the wavelength-multiplexed signal light streams S1a, S2a, S1b, and S2b is an example of second multi-wavelength light.

The setting processing section 1 sets wavelengths in the ports a to c of the input-side WSSs 24a, 25a, 24b, and 25b so that wavelengths of the wavelength light input to the ports d to g of the output-side WSS 26a do not overlap each other and wavelengths of the wavelength light input to the ports d to g of the output-side WSS 26b do not overlap each other. Thus, wavelengths of the wavelength light included in the wavelength-multiplexed signal light stream S1c do not overlap each other, and wavelengths of the wavelength light included in the wavelength-multiplexed signal light stream S2c do not overlap each other.

The optical amplifiers 27a and 27b amplify the wavelength-multiplexed signal light streams S1c and S2c output from the output-side WSSs 26a and 26b, respectively. The wavelength-multiplexed signal light stream S1c is input to the wavelength converter 28 from the optical amplifier 27a. The wavelength-multiplexed signal light stream S2c is input to the multiplexer 29 from the optical amplifier 27b.

The wavelength converter 28 converts the wavelength band of the wavelength-multiplexed signal light stream S1c from the C-band to the L-band. The wavelength-multiplexed signal light stream S1c in the L-band is input to the multiplexer 29. The multiplexer 29 is, for example, an optical filter or an optical coupler and generates multiplexed light Sc by multiplexing the wavelength-multiplexed signal light streams S1c and S2c. The multiplexed light Sc is output to the transmission line 9. The multiplexer 29 is an example of a first multiplexer. The wavelength converter 28 is an example of a third wavelength converter.

The setting processing section 1 executes a process of setting the wavelength multiplexer 40 based on information, received from the network monitoring and control device 8, of the paths Pa and Pb. For example, the setting processing section 1 sets, in the input-side WSSs 24a, 24b, 25a, and 25b, the wavelength light (wavelengths) to be output from the ports b and c of the input-side WSSs 24a, 24b, 25a, and 25b. For example, the setting processing section 1 sets the ports b and c that are output destinations of the wavelength light. The setting processing section 1 sets, in the output-side WSSs 26a and 26b, the wavelength light (wavelengths) to be input to the output-side WSSs 26a and 26b from the ports d to g and the wavelength light (wavelengths) to be output from the ports h of the output-side WSSs 26a and 26b.

A process of wavelength-multiplexing the wavelength-multiplexed signal light stream S1b in the L-band with the wavelength-multiplexed signal light stream S2a in the C-band in the foregoing configuration is described using the example illustrated in FIG. 2.

A reference symbol R1b Indicates a line for the wavelength-multiplexed signal light stream S1b. A reference symbol W11 indicates an example of the spectrum of the wavelength-multiplexed signal light stream S1b output from the wavelength converter 21b. The wavelength band of the wavelength-multiplexed signal light stream S1b is converted by the wavelength converter 21b from the L-band to the C-band. The wavelength-multiplexed signal light stream S1b is input to the port a of the input-side WSS 24b.

The input-side WSS 24b outputs each wavelength light included in the wavelength-multiplexed signal light stream S1b from the port b or c. The setting processing section 1 sets an output destination of each wavelength light of the wavelength-multiplexed signal light stream S1b to the port c of the input-side WSS 24b so that each wavelength light of the wavelength-multiplexed signal light stream S1b is output to the output-side WSS 26b.

A reference symbol R1a Indicates a line for the wavelength-multiplexed signal light stream S2a. The wavelength-multiplexed signal light stream S2a is input to the port a of the input-side WSS 25a. The input-side WSS 25a outputs each wavelength light included in the wavelength-multiplexed signal light stream S2a from the port b or c. The setting processing section 1 sets an output destination of each wavelength light of the wavelength-multiplexed signal light stream S2a to the port c of the input-side WSS 25a so that the wavelength-multiplexed signal light stream S2a is output to the output-side WSS 26b.

A reference symbol W12 indicates an example of the spectrum of the wavelength-multiplexed signal light stream S2a output from the port c of the input-side WSS 25a. As described above, an available channel (refer to a dotted line) exists for the wavelength-multiplexed signal light stream S2a.

Each wavelength light of the wavelength-multiplexed signal light stream S1b is input to the port e of the output-side WSS 26b. Each wavelength light of the wavelength-multiplexed signal light stream S2a is input to the port f of the output-side WSS 26b. The setting processing section 1 sets an output destination of each wavelength light of the wavelength-multiplexed signal light streams S2a and S1b to the port h of the output-side WSS 26b so that each wavelength light of the wavelength-multiplexed signal light streams S2a and S1b is wavelength-multiplexed.

Thus, each wavelength light of the wavelength-multiplexed signal light streams S2a and S1b is wavelength-multiplexed into the wavelength-multiplexed signal light stream S2c, and the wavelength-multiplexed signal light stream S2c is output from the port h of the output-side WSS 26b to the optical amplifier 27b.

In the foregoing manner, the output-side WSS 26b wavelength-multiplexes each wavelength light of the wavelength-multiplexed signal light stream S2a input to the port f and each wavelength light of the wavelength-multiplexed signal light stream S1b input to the port e into the wavelength-multiplexed signal light stream S2c and outputs the wavelength-multiplexed signal light stream S2c.

A reference symbol W13 indicates an example of the spectrum of the wavelength-multiplexed signal light stream S2c output from the port h of the output-side WSS 26b. The wavelength band of the wavelength-multiplexed signal light stream S1b is converted by the wavelength converter 21b from the L-band to the C-band. Thus, the wavelength-multiplexed signal light stream S2c includes the wavelength-multiplexed wavelength light of the wavelength-multiplexed signal light streams S2a and S1b in the C-band.

Since the wavelength converter 21b converts the wavelength band of the wavelength-multiplexed signal light stream S1b from the L-band to the C-band, the wavelength-multiplexed signal light stream S1b may be wavelength-multiplexed with the C-band wavelength-multiplexed signal light stream S2a for which an available channel exists.

A reference symbol R2a indicates a line for the wavelength-multiplexed signal light stream S1a. The wavelength-multiplexed signal light stream S1a in the L-band is input to the wavelength converter 21a, and the wavelength band of the wavelength-multiplexed signal light stream S1a is converted by the wavelength converter 21a from the L-band to the C-band. The wavelength-multiplexed signal light stream S1a in the C-band is input to the port a of the input-side WSS 24a.

The input-side WSS 24a outputs each wavelength light included in the wavelength-multiplexed signal light stream S1a from the port b in accordance with the settings of the setting processing section 1. Each wavelength light of the wavelength-multiplexed signal light stream S1a is input to the port d of the output-side WSS 26a.

The output-side WSS 26a generates the wavelength-multiplexed signal light stream S1c by wavelength-multiplexing the wavelength light input from the port d and outputs the wavelength-multiplexed signal light stream S1c from the port h in accordance with the settings of the setting processing section 1. The wavelength-multiplexed signal light stream S1c is input to the wavelength converter 28. The wavelength converter 28 converts the wavelength band of the wavelength-multiplexed signal light stream S1c from the C-band to the L-band. Thus, the wavelength band of the wavelength-multiplexed signal light stream S1c is the L-band that is the same as the wavelength band of the wavelength-multiplexed signal light stream S1a input to the transmitting device.

The multiplexer 29 generates the multiplexed light Sc by multiplexing the wavelength-multiplexed signal light stream S1c in the L-band with the wavelength-multiplexed signal light stream S2c in the C-band. The multiplexed light Sc is output to the transmission line 9 and reaches the node #5. Thus, the transmitting device may relay the wavelength-multiplexed signal light stream S2b in accordance with the path Pb.

Next, the following example is described. In the example, the wavelength-multiplexed signal light stream S1b in the L-band and the wavelength-multiplexed signal light stream S1a in the L-band are wavelength-multiplexed and relayed.

Figure 5:
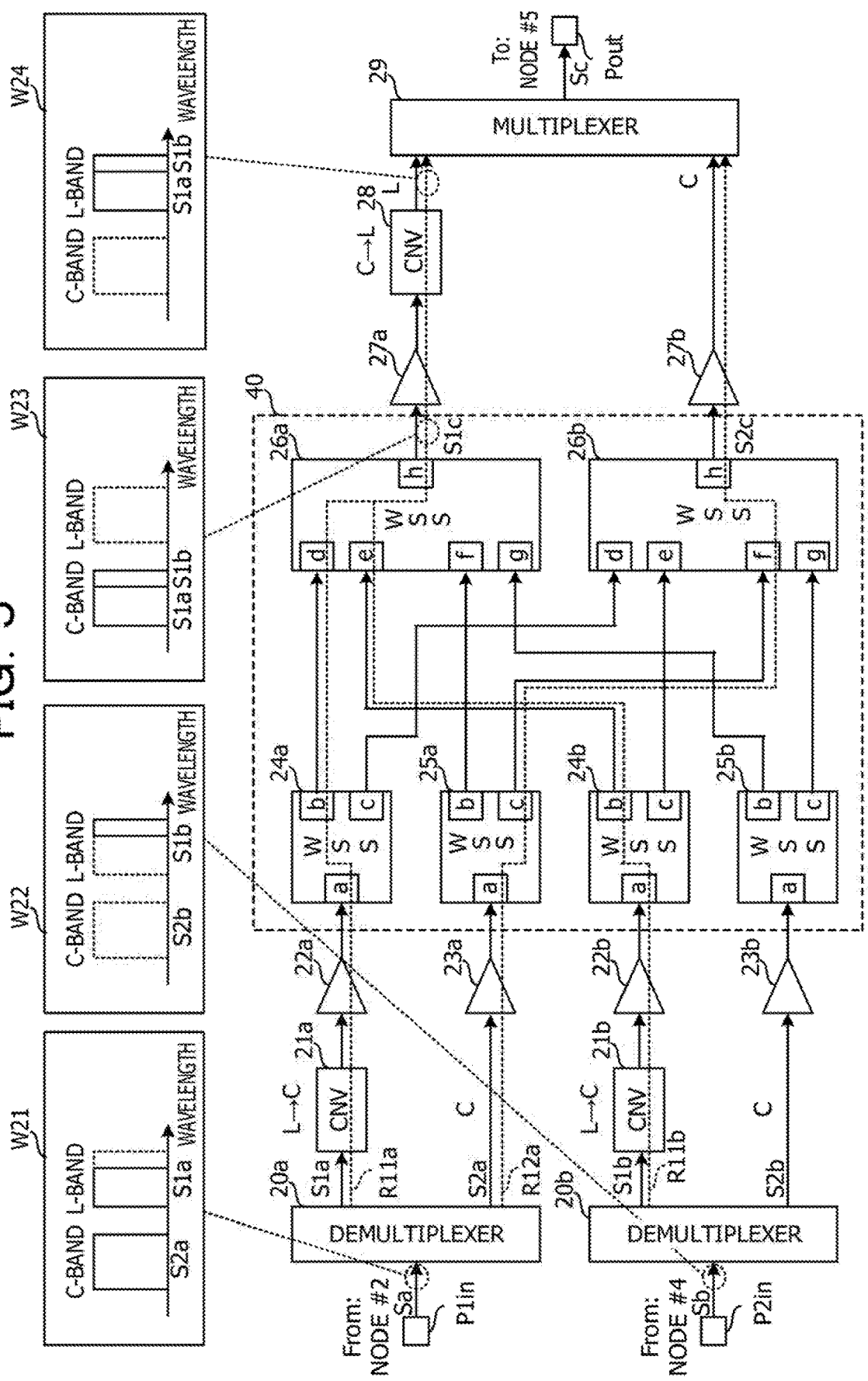
FIG. 5 is a diagram illustrating an example in which a wavelength-multiplexed signal light stream in the L-band and a wavelength-multiplexed signal light stream in the L-band are wavelength-multiplexed and relayed.

FIG. 5 is a diagram illustrating the example in which the wavelength-multiplexed signal light stream S1b in the L-band and the wavelength-multiplexed signal light stream S1a in the L-band are wavelength-multiplexed and relayed. Configurations illustrated in FIG. 5 and common to those illustrated in FIG. 4 are indicated by the same reference symbols as those illustrated in FIG. 4 and are not described below.

A reference symbol W21 indicates an example of the spectrum of the multiplexed light Sa input from the node #2. A reference symbol W22 indicates an example of the spectrum of the multiplexed light Sb input from the node #4. This example assumes that an available channel exists for the wavelength-multiplexed signal light stream S1a in the L-band, but an available channel does not exist for the wavelength-multiplexed signal light stream S2a in the C-band, unlike the example illustrated in FIG. 2.

A reference symbol R11a indicates a line for the wavelength-multiplexed signal light stream S1a. The wavelength-multiplexed signal light stream S1a is input to the wavelength converter 21a. The wavelength converter 21a converts the wavelength band of the wavelength-multiplexed signal light stream S1a from the L-band to the C-band. The wavelength-multiplexed signal light stream S1a is input to the port a of the input-side WSS 24a.

The setting processing section 1 sets an output destination of each wavelength light of the wavelength-multiplexed signal light stream S1a to the port b of the input-side WSS 24a so that each wavelength light of the wavelength-multiplexed signal light stream S1a is output to the output-side WSS 26a. Thus, each wavelength light of the wavelength-multiplexed signal light stream S1a is input to the port d of the output-side WSS 26a.

A reference symbol R11b indicates a line for the wavelength-multiplexed signal light stream S1b. The wavelength-multiplexed signal light stream S1b is input to the wavelength converter 21b. The wavelength converter 21b converts the wavelength band of the wavelength-multiplexed signal light stream S1b from the L-band to the C-band. The wavelength-multiplexed signal light stream S1b is input to the port a of the input-side WSS 24b.

The setting processing section 1 sets an output destination of each wavelength light of the wavelength-multiplexed signal light stream S1b to the port b of the input-side WSS 24b so that each wavelength light of the wavelength-multiplexed signal light stream S1b is output to the output-side WSS 26a. Thus, each wavelength light of the wavelength-multiplexed signal light stream S1b is input to the port e of the output-side WSS 26a.

Each wavelength light of the wavelength-multiplexed signal light stream S1a is input to the port d of the output-side WSS 26a. Each wavelength light of the wavelength-multiplexed signal light stream S1b is input to the port e of the output-side WSS 26a. The setting processing section 1 sets an output destination of each wavelength light of the wavelength-multiplexed signal light streams S1a and S1b to the port h of the output-side WSS 26a so that each wavelength light of the wavelength-multiplexed signal light stream S1b is wavelength-multiplexed with the wavelength-multiplexed signal light stream S1a.

The output-side WSS 26a wavelength-multiplexes each wavelength light of the wavelength-multiplexed signal light stream S1a input to the port d and each wavelength light of the wavelength-multiplexed signal light stream S1b input to the port e into the wavelength-multiplexed signal light stream S1c and outputs the wavelength-multiplexed wavelength light S1c. Thus, each wavelength light of the wavelength-multiplexed signal light streams S1a and S1b is wavelength-multiplexed into the wavelength-multiplexed signal light stream S1c, and the wavelength-multiplexed signal light stream S1c is output to the optical amplifier 27a from the port h of the output-side WSS 26a.

A reference symbol W23 indicates an example of the spectrum of the wavelength-multiplexed signal light stream S1c output from the output-side WSS 26a. The wavelength band of the wavelength-multiplexed signal light stream S1b is converted by the wavelength converter 21b from the L-band to the C-band, and the wavelength band of the wavelength-multiplexed signal light stream S1a is converted by the wavelength converter 21a from the L-band to the C-band. Thus, the wavelength-multiplexed signal light stream S1c includes the wavelength-multiplexed wavelength light of the wavelength-multiplexed signal light streams S1a and S1b in the C-band.

Since the wavelength converter 21b converts the wavelength band of the wavelength-multiplexed signal light stream S1b from the L-band to the C-band and the wavelength converter 21a converts the wavelength band of the wavelength-multiplexed signal light stream S1a from the L-band to the C-band, each wavelength light of the wavelength-multiplexed signal light stream S1b in the L-band may be contained in an available channel for the wavelength-multiplexed signal light stream S2a in the L-band.

The wavelength converter 28 converts the wavelength band of the wavelength-multiplexed signal light stream S1c from the C-band to the L-band. Thus, the wavelength band of the wavelength-multiplexed signal light stream S1c is the L-band that is the same as the wavelength band of the wavelength-multiplexed signal light stream S1a input to the transmitting device.

A reference symbol R12a indicates a line for the wavelength-multiplexed signal light stream S2a. The wavelength-multiplexed signal light stream S2a in the C-band is input to the port a of the input-side WSS 25a. The input-side WSS 25a outputs, from the port c, each wavelength light included in the wavelength-multiplexed signal light stream S2a in accordance with the settings of the setting processing section 1. Each wavelength light of the wavelength-multiplexed signal light stream S2a is input to the port f of the output-side WSS 26b.

The output-side WSS 26b generates the wavelength-multiplexed signal light stream S2c by wavelength-multiplexing the wavelength light input from the port f and outputs the wavelength-multiplexed wavelength light S2c from the port h in accordance with the settings of the setting processing section 1.

The multiplexer 29 generates the multiplexed light Sc by multiplexing the wavelength-multiplexed signal light stream S1c in the L-band with the wavelength-multiplexed signal light stream S2c in the C-band. The multiplexed light Sc is output to the transmission line 9 and reaches the node #5. Thus, the transmitting device may relay the wavelength-multiplexed signal light stream S1b in accordance with the path Pb.

Next, the following example is described. In the example, the wavelength-multiplexed signal light stream S2b in the C-band and the wavelength-multiplexed signal light stream S1a in the L-band are wavelength-multiplexed and relayed.

Figure 6:
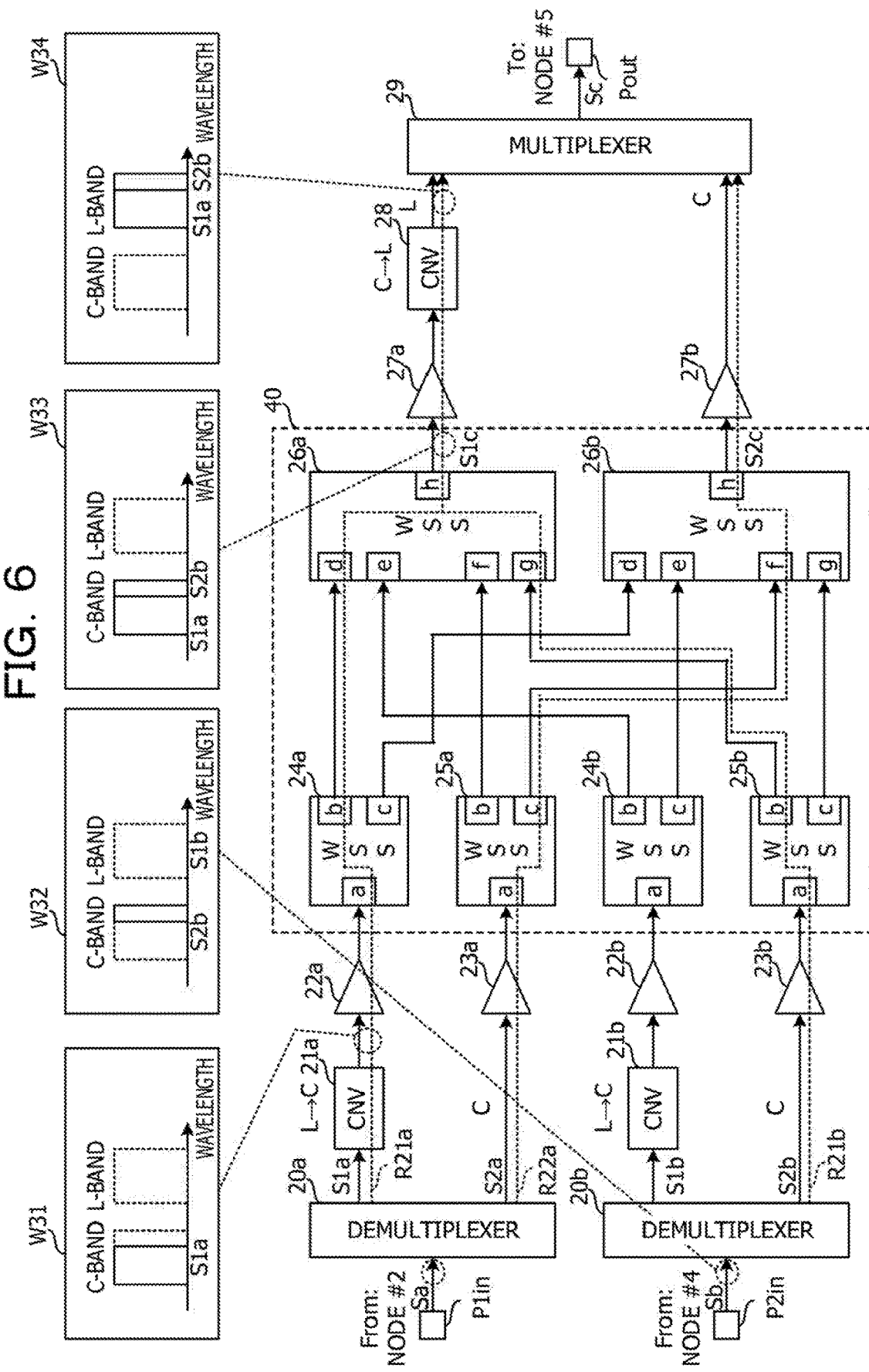
FIG. 6 is a diagram illustrating an example in which a wavelength-multiplexed signal light stream in the C-band and the wavelength-multiplexed signal light stream in the L-band are wavelength-multiplexed and relayed.

FIG. 6 is a diagram illustrating the example in which the wavelength-multiplexed signal light stream S2b in the C-band and the wavelength-multiplexed signal light stream S1a in the L-band are wavelength-multiplexed and relayed. Configurations illustrated in FIG. 6 and common to those illustrated in FIG. 4 are indicated by the same reference symbols as those illustrated in FIG. 4 and are not described below.

This example assumes that an available channel exists for the L-band wavelength-multiplexed signal light stream S1a included in the multiplexed light Sa input from the node #2 and an available channel does not exist for the C-band wavelength-multiplexed signal light stream S2a included in the multiplexed light Sa input from the node #2, as indicated by the reference symbol W21 in FIG. 5.

A reference symbol W32 indicates an example of the spectrum of the multiplexed light Sb input from the node #4. In the multiplexed light Sb that is described in this example, only the wavelength-multiplexed signal light stream S2b in the C-band is included and the wavelength-multiplexed signal light stream S1b in the L-band is not included, unlikely the example illustrated in FIG. 2.

A reference symbol R21a indicates a line for the wavelength-multiplexed signal light stream S1a. The wavelength-multiplexed signal light stream S1a is input to the wavelength converter 21a. A reference symbol W31 indicates an example of the spectrum of the wavelength-multiplexed signal light stream S1a output from the wavelength converter 21a. The wavelength converter 21a converts the wavelength band of the wavelength-multiplexed signal light stream S1a from the L-band to the C-band. The wavelength-multiplexed signal light stream S1a is input to the port a of the input-side WSS 24a.

The setting processing section 1 sets an output destination of each wavelength light of the wavelength-multiplexed signal light stream S1a to the port b of the input-side WSS 24a so that each wavelength light of the wavelength-multiplexed signal light stream S1a is output to the output-side WSS 26a. Thus, each wavelength light of the wavelength-multiplexed signal light stream S1a is input to the port d of the output-side WSS 26a.

A reference symbol R21b indicates a line for the wavelength-multiplexed signal light stream S2b. The wavelength-multiplexed signal light stream S2b in the C-band is input to the port a of the input-side WSS 25b. The input-side WSS 25b outputs each wavelength light included in the wavelength-multiplexed signal light stream S2b from the port b in accordance with the settings of the setting processing section 1. Each wavelength light of the wavelength-multiplexed signal light stream S2b is input to the port g of the output-side WSS 26a.

Each wavelength light of the wavelength-multiplexed signal light stream S1a is input to the port d of the output-side WSS 26a. Each wavelength light of the wavelength-multiplexed signal light S2b is input to the port g of the output-side WSS 26a. The setting processing section 1 sets an output destination of each wavelength light of the wavelength-multiplexed signal light streams S1a and S2b to the port h of the output-side WSS 26a so that each wavelength light of the wavelength-multiplexed signal light streams S1a and S2b is wavelength-multiplexed.

Thus, each wavelength light of the wavelength-multiplexed signal light streams S1a and S2b is wavelength-multiplexed into the wavelength-multiplexed signal light stream S1c, and the wavelength-multiplexed signal light stream S1c is output from the port h of the output-side WSS 26a to the optical amplifier 27a.

A reference symbol W33 indicates an example of the spectrum of the wavelength-multiplexed signal light stream S1c output from the output-side WSS 26a. The wavelength band of the wavelength-multiplexed signal light stream S1a is converted by the wavelength converter 21a from the L-band to the C-band. Thus, the wavelength-multiplexed signal light stream S1c includes the wavelength-multiplexed wavelength light of the wavelength-multiplexed signal light streams S1a and S2b in the C-band.

Since the wavelength converter 21a converts the wavelength band of the wavelength-multiplexed signal light stream S1a from the L-band to the C-band, each wavelength light of the wavelength-multiplexed signal light stream S2b in the C-band may be contained in an available channel for the wavelength-multiplexed signal light stream S2a in the L-band.

The wavelength converter 28 converts the wavelength band of the wavelength-multiplexed signal light stream S1c from the C-band to the L-band. A reference symbol W34 indicates an example of the spectrum of the wavelength-multiplexed signal light stream S1c output from the wavelength converter 28. The wavelength band of the wavelength-multiplexed signal light stream S1c is the L-band that is the same as the wavelength band of the wavelength-multiplexed signal light stream S1a input to the transmitting device.

A reference symbol R22a Indicates a line for the wavelength-multiplexed signal light stream S2a. The line for the wavelength-multiplexed signal light stream S2a is the same as the line indicated by the foregoing reference symbol 12a.

The multiplexer 29 generates the multiplexed light Sc by multiplexing the wavelength-multiplexed signal light stream S1c in the L-band with the wavelength-multiplexed signal light stream S2c in the C-band. The multiplexed light Sc is output to the transmission line 9 and reaches the node #5. Thus, the transmitting device may relay the wavelength-multiplexed signal light stream S2b in accordance with the path Pb.

Unlike this example, when an available channel exists for the wavelength-multiplexed signal light stream S2a in the C-band, each wavelength light of the wavelength-multiplexed signal light streams S2a and S2b may be wavelength-multiplexed. In this case, the line for the wavelength-multiplexed signal light stream S2a is indicated by the reference symbol R22a. The wavelength-multiplexed signal light stream S2b is input to the port g of the output-side WSS 26b from the port c of the input-side WSS 25b.

The output-side WSS 26b wavelength-multiplexes the wavelength-multiplexed signal light stream S2a input from the port f and the wavelength-multiplexed signal light stream S2b input from the port g into the wavelength-multiplexed signal light stream S2c and outputs the wavelength-multiplexed signal light stream S2c from the port h in accordance with the settings of the setting processing section 1. Thus, the transmitting device may relay the wavelength-multiplexed signal light stream S2b in accordance with the path Pb.

In the foregoing manner, the wavelength multiplexer 40 generates the wavelength-multiplexed signal light stream S1c by wavelength-multiplexing each wavelength light in the L-band among the wavelength light included in the wavelength-multiplexed signal light streams S1a, S2a, S1b, and S2b so that wavelengths do not overlap each other, and generates the wavelength-multiplexed signal light stream S2c by wavelength-multiplexing each wavelength light in the C-band among the wavelength light included in the wavelength-multiplexed signal light streams S1a, S2a, S1b, and S2b so that wavelengths do not overlap each other. Thus, even when wavelengths of the wavelength-multiplexed signal light streams S1a and S1b in the L-band overlap each other, or even when wavelengths of the wavelength-multiplexed signal light streams S2a and S2b in the C-band overlap each other, the transmitting device relay the wavelength-multiplexed signal light streams S1a, S2a, S1b, and S2b based on an available channel.

It is, therefore, possible to ease a constraint for the path Pb for the wavelength-multiplexed signal light streams S1a, S2a, S1b, and S2b. The wavelength multiplexer 40 is an example of a generator.

Each of the input-side WSSs 24a, 25a, 24b, and 25b may output wavelength light of each of the wavelength-multiplexed signal light streams S1a, S2a, S1b, and S2b to any of the output-side WSSs 26a and 26b. By switching an output destination of the wavelength light from the input-side WSSs 24a, 25a, 24b, and 25b, each wavelength light of the wavelength-multiplexed signal light streams S1a, S2a, S1b, and S2b may be wavelength-multiplexed into the wavelength-multiplexed signal light stream S1c or S2c.

(Transmitting Device of Node #5)

Next, the transmitting device of the node #5 is described.

Figure 7:
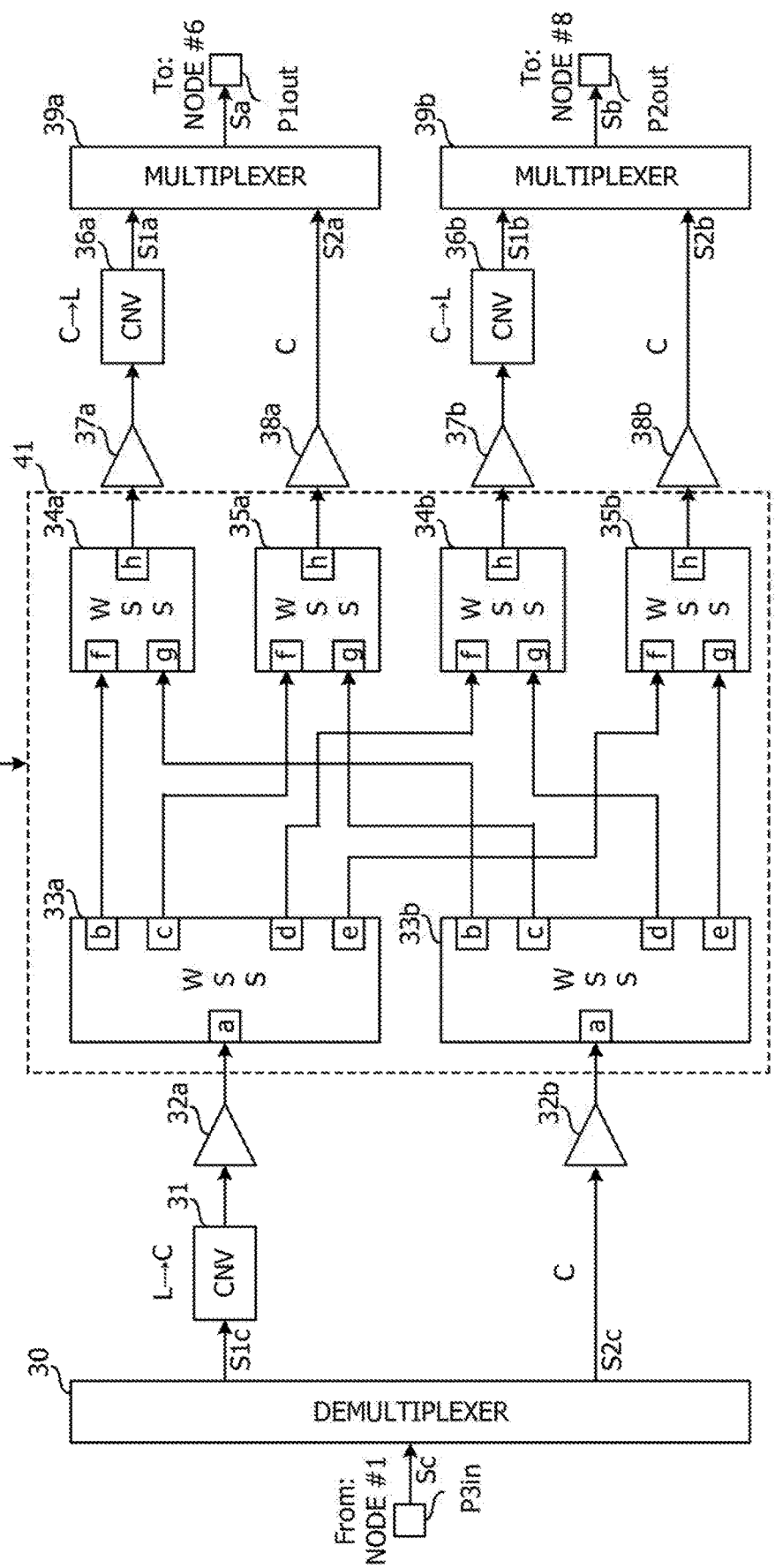
FIG. 7 is a configuration diagram illustrating an example of a transmitting device of a node.

FIG. 7 is a configuration diagram illustrating an example of the transmitting device of the node #5. The transmitting device of the node #5 is an example of a second transmitting device and includes an input port P3in, output ports P1out and P2out, a setting processing section 4, a demultiplexer 30, wavelength converters (CNV) 31, 36a, and 36b, optical amplifiers 32a, 32b, 37a, 37b, 38a, and 38b, a wavelength multiplexer 41, and multiplexers 39a and 39b. Each of the wavelength converters 31, 36a, and 36b has the configuration illustrated in FIG. 3, for example.

FIG. 7 illustrates a configuration for a relay process to be executed on the paths Pa and Pb illustrated in FIG. 2. In other words, FIG. 7 illustrates the configuration related to the process to be executed on the wavelength-multiplexed signal light streams S1a, S2a, S1b, and S2b that are input and output from and to routes between the nodes #1, #6, and #8.

The multiplexed light Sc is input to the input port P3in from the node #1. The input port P3in includes an optical coupler coupled to the transmission line, for example. The multiplexed light Sc is input to the demultiplexer 30 from the input port P3in. The demultiplexer 30 demultiplexes the wavelength-multiplexed signal light streams S1c and S2c from the multiplexed light Sc. The demultiplexer 30 is, for example, an optical filter or an optical splitter.

The wavelength-multiplexed signal light stream S1c is input to the wavelength converter 31 from the demultiplexer 30. The wavelength converter 31 converts the wavelength band of the wavelength-multiplexed signal light stream S1c from the L-band to the C-band. Thus, the wavelength-multiplexed signal light stream S1c may be processed by an inexpensive optical component that supports the C-band. The wavelength converter 31 is an example of a fourth wavelength converter.

The wavelength-multiplexed signal light stream S1c is input to the optical amplifier 32a from the wavelength converter 31 and amplified by the optical amplifier 32a. The wavelength-multiplexed signal light stream S2c is input to the optical amplifier 32b from the demultiplexer 30 and amplified by the optical amplifier 32b. The wavelength-multiplexed signal light streams S1c and S2c are input to the wavelength multiplexer 41 from the optical amplifiers 32a and 32b.

The wavelength multiplexer 41 includes input-side WSSs 33a and 33b and output-side WSSs 34a, 34b, 35a, and 35b.

Each of the input-side WSSs 33a and 33b includes ports a to e. Each of the output-side WSSs 34a, 34b, 35a, and 35b includes ports f to h.

The wavelength-multiplexed signal light streams S1c and S2c are input to the ports a of the input-side WSSs 33a and 33b from the optical amplifiers 32a and 32b, respectively. The input-side WSSs 33a and 33b separate the wavelength light from the wavelength-multiplexed signal light streams S1c and S2c and output the wavelength light from the ports b to e. In this case, the wavelength light is wavelength-multiplexed for each of the ports b and c.

The wavelength-multiplexed wavelength light is input to the ports f and g of the output-side WSSs 34a, 34b, 35a, and 35b. Each of the output-side WSSs 34a, 34b, 35a, and 35b temporarily separates the wavelength light input from the ports f and g, wavelength-multiplexes the wavelength light into the since wavelength-multiplexed signal light stream S1a, S2a, S1b, or S2b, and outputs the wavelength-multiplexed signal light stream S1a, S2a, S1b, or S2b from the port h.

Each of the input-side WSSs 33a and 33b is coupled to the output-side WSSs 34a, 34b, 35a, and 35b. Thus, the input-side WSSs 33a and 33b are cross-coupled to the output-side WSSs 34a, 34b, 35a, and 35b.

The port b of the input-side WSS 33a is coupled to the port f of the output-side WSS 34a. The port c of the input-side WSS 33a is coupled to the port f of the output-side WSS 35a. The port d of the input-side WSS 33a is coupled to the port f of the output-side WSS 34b. The port e of the input-side WSS 33a is coupled to the port f of the output-side WSS 35b.

The port b of the input-side WSS 33b is coupled to the port g of the output-side WSS 34a. The port c of the input-side WSS 33b is coupled to the port g of the output-side WSS 35a. The port d of the input-side WSS 33b is coupled to the port g of the output-side WSS 34b. The port e of the input-side WSS 33b is coupled to the port g of the output-side WSS 35b.

In the coupling form, each wavelength light included in the wavelength-multiplexed signal light streams S1c and S2c may be output to the output-side WSSs 34a, 35a, 34b, and 35b. Thus, the wavelength multiplexer 41 may demultiplex the wavelength-multiplexed signal light streams S1a, S1b, S2a, and S2b from the wavelength-multiplexed signal light stream S1c in the L-band. The wavelength multiplexer 41 may demultiplex the wavelength-multiplexed signal light streams S1a, S1b, S2a, and S2b from the wavelength-multiplexed signal light stream S2c in the C-band. The following describes operations of the input-side WSSs 33a and 33b and operations of the output-side WSSs 34a, 34b, 35a, and 35b in the example illustrated in FIG. 2.

The setting processing section 4 is, for example, a circuit including a central processing unit (CPU) and executes a process of setting the input-side WSSs 33a and 33b and the output-side WSSs 34a, 34b, 35a, and 35b in accordance with, for example, information acquired from the network monitoring and control device 8. The setting processing section 4 sets, in the input-side WSSs 33a and 33b, the ports b to e that are output destinations of the wavelength light included in the wavelength-multiplexed signal light streams S1c and S2c input from the ports a. The setting processing section 4 sets, in the output-side WSSs 34a, 34b, 35a, and 35b, wavelength light (wavelengths) to be output from the ports h among the wavelength light input from the ports f and g.

The input-side WSS 33a outputs each wavelength light included in the wavelength-multiplexed signal light stream S1*a* among the wavelength light of the wavelength-multiplexed signal light stream S1*c* to the port f of the output-side WSS 34*a* from the port b. The input-side WSS 33*a* outputs each wavelength light included in the wavelength-multiplexed signal light stream S1*b* among the wavelength light of the wavelength-multiplexed signal light stream S1*c* to the port f of the output-side WSS 34*b* from the port d and outputs each wavelength light included in the wavelength-multiplexed signal light stream S2*b* among the wavelength light of the wavelength-multiplexed signal light stream S1*c* to the port f of the output-side WSS 35*b* from the port e.

The input-side WSS 33*b* outputs each wavelength light included in the wavelength-multiplexed signal light stream S2*a* among the wavelength light of the wavelength-multiplexed signal light stream S2*c* to the port g of the output-side WSS 35*a* from the port c. The input-side WSS 33*b* outputs each wavelength light included in the wavelength-multiplexed signal light stream S1*b* among the wavelength light of the wavelength-multiplexed signal light stream S2*c* to the port g of the output-side WSS 34*b* from the port d and outputs each wavelength light included in the wavelength-multiplexed signal light stream S2*b* among the wavelength light of the wavelength-multiplexed signal light stream S2*c* to the port g of the output-side WSS 35*b* from the port e.

The output-side WSS 34*a* generates the wavelength-multiplexed signal light stream S1*a* by wavelength-multiplexing the wavelength light input from the input-side WSSs 33*a* and 33*b*. The output-side WSS 35*a* generates the wavelength-multiplexed signal light stream S2*a* by wavelength-multiplexing the wavelength light input from the input-side WSSs 33*a* and 33*b*. The output-side WSS 34*b* generates the wavelength-multiplexed signal light stream S1*b* by wavelength-multiplexing the wavelength light input from the input-side WSSs 33*a* and 33*b*. The output-side WSS 35*b* generates the wavelength-multiplexed signal light stream S2*b* by wavelength-multiplexing the wavelength light input from the input-side WSSs 33*a* and 33*b*.

In the foregoing manner, the wavelength multiplexer 41 reproduces the wavelength-multiplexed signal light streams S1*a*, S2*a*, S1*b*, and S2*b* from the wavelength light included in the wavelength-multiplexed signal light streams S1*c* and S2*c*. The wavelength multiplexer 41 is an example of a reproducer.

The wavelength-multiplexed signal light streams S1*a*, S2*a*, S1*b*, and S2*b* output from the output-side WSSs 34*a*, 34*b*, 35*a*, and 35*b* are input to and amplified by the optical amplifiers 37*a*, 38*a*, 37*b*, and 38*b*. The wavelength-multiplexed signal light stream S1*a* is input to the wavelength converter 36*a* from the optical amplifier 37*a*. The wavelength-multiplexed signal light stream S1*b* Is input to the wavelength converter 36*b* from the optical amplifier 37*b*.

The wavelength converter 36*a* converts the wavelength band of the wavelength-multiplexed signal light stream S1*a* from the C-band to the L-band. The wavelength converter 36*b* converts the wavelength band of the wavelength-multiplexed signal light stream S1*b* from the C-band to the L-band. The wavelength converter 36*a* is an example of a fifth wavelength converter. The wavelength converter 36*b* is an example of a sixth wavelength converter.

The wavelength-multiplexed signal light stream S2*a* is input to the multiplexer 39*a* from the optical amplifier 38*a*. The wavelength-multiplexed signal light stream S2*b* is input to the multiplexer 39*b* from the optical amplifier 38*b*.

The multiplexer 39*a* generates the multiplexed light Sa by multiplexing the wavelength-multiplexed signal light stream S1*a* in the L-band with the wavelength-multiplexed signal light stream S2*a* in the C-band. The multiplexed light Sa is transmitted to the node #6 in accordance with the path Pa. The multiplexer 39*a* is an example of a first reception-side multiplexer.

The multiplexer 39*b* generates the multiplexed light Sb by multiplexing the wavelength-multiplexed signal light stream S1*b* in the L-band with the wavelength-multiplexed signal light stream S2*b* in the C-band. The multiplexed light Sb is transmitted to the node #8 in accordance with the path Pb. The multiplexer 39*b* is an example of a second reception-side multiplexer.

Thus, the transmitting device of the node #5 may relay the wavelength-multiplexed signal light streams S1*a* and S2*a* in accordance with the path Pa and relay the wavelength-multiplexed signal light streams S1*b* and S2*b* in accordance with the path Pb.

(Operations of Network Monitoring and Control Device 8)

The setting processing sections 1 and 4 of the foregoing transmitting devices set wavelengths in the WSSs within the wavelength multiplexers 40 and 41 in accordance with instructions from the network monitoring and control device 8. The setting processing section 1 is an example of a setting section.

Figure 8:
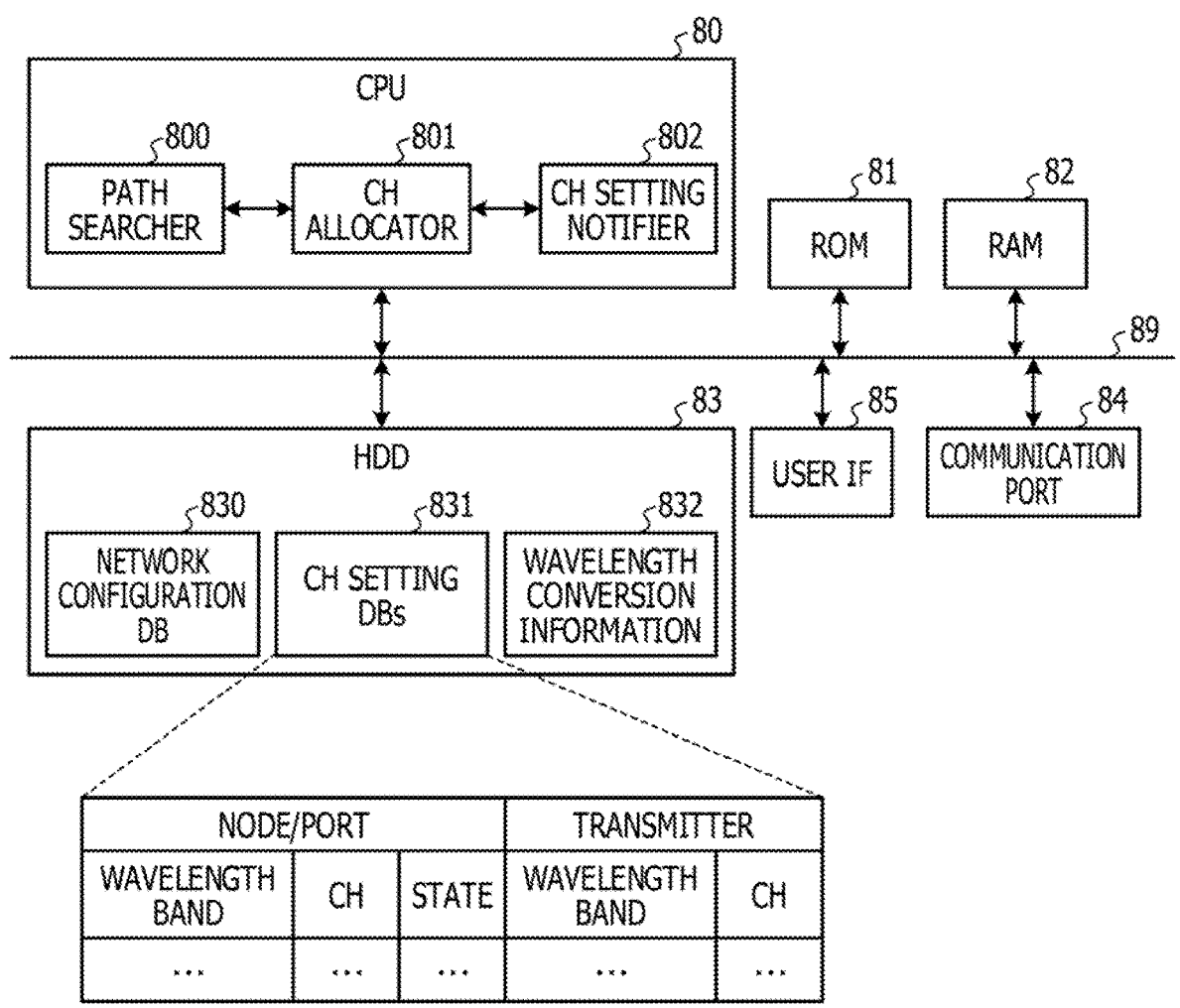
FIG. 8 is a configuration diagram illustrating an example of a network monitoring and control device.

FIG. 8 is a configuration diagram illustrating an example of the network monitoring and control device 8. The network monitoring and control device 8 includes a CPU 80, a read-only memory (ROM) 81, a random-access memory (RAM) 82, a hard disk drive (HDD) 83, a user interface (IF) 85, and a communication port 14. The CPU 80 is coupled to the ROM 81, the RAM 82, the HDD 83, the user IF 85, and the communication port 84 via a bus 89 to enable signals to be input and output to and from the CPU 80, the ROM 81, the RAM 82, the HDD 83, the user IF 85, and the communication port 84 via the bus 89.

In the ROM 81, a program for driving the CPU 80 is stored. The RAM 82 functions as a working memory for the CPU 80. The user IF 85 is a keyboard, a communication section, or the like that receives an operation from a network administrator. The communication port 84 is, for example, a local area network (LAN) port and relays communication between the setting processing sections 1 and 4 of the transmitting devices and the CPU 80.

The CPU 80 reads the program from the ROM 81 to form a path searcher 800, a channel (CH) allocator 801, and a channel (CH) setting notifier 802 as functions. In the HDD 83, a network configuration database (DB) 830, channel setting databases (CH setting DBs) 831, and wavelength conversion information 832 are stored in advance.

The path searcher 800 searches for a path based on a request, received by the user IF 85 from a user, to set a path from the network configuration DB 830. In the network configuration DB 830, information on the coupling configuration of the nodes #1 to #8 within the network NW #1 and NW #2 illustrated in FIG. 2 is registered. The path searcher 800 selects the nodes #1 to #8 through which the path requested extend.

The CH allocator 801 searches for an available channel for setting of a new path from the CH setting DBs 831 based on a notification received from the path searcher 800 and indicating path setting. In the CH setting DBs 831, wavelength bands, channels (CHs), and states of wavelength light included in wavelength-multiplexed signal light streams for each of the nodes #1 to #8 and the ports (for example, the input ports P1in to P3in and the output ports Pout, P1out, and P2out), and a wavelength band and channel for each of transmitters Tx that are sources of the wavelength light are registered.

In Information of each of the wavelength bands, the L-band or the C-band is registered. In information of the channels, channel numbers associated with wavelengths of the wavelength light are registered. In information of each of the states, a value (1) indicating that a wavelength is already allocated to a channel or a value (0) indicating that the wavelength light is not allocated to the channel, or a value indicating whether the channel is being used or not is registered. The wavelengths of the wavelength light included in the wavelength-multiplexed signal light streams S1a, S1b, S2a, S2b, S1c, and S2c are registered in a CH setting DB 831 for the node #1. The HDD 83 is an example of a storage section. A memory, however, may be used as the storage section, instead of the HDD 83.

The CH allocator 801 detects, based on the CH setting DB 831, a channel able to be allocated to each wavelength light of a wavelength-multiplexed signal light stream targeted for path setting. The CH allocator 801 detects, for each wavelength band, overlapping of wavelengths of each wavelength light of a new wavelength-multiplexed signal light stream with wavelengths of each wavelength light of another wavelength-multiplexed signal light stream for which a path is already set. For path setting of the node #1, the CH allocator 801 detects overlapping of wavelengths of the wavelength-multiplexed signal light streams S1a and S1b in the L-band and overlapping of wavelengths of the wavelength-multiplexed signal light streams S2a and S2b in the C-band.

The CH allocator 801 allocates, based on the results of the detection of the overlapping of the wavelengths, channels to each wavelength light included in the L-band wavelength-multiplexed signal light stream S1c to be output from the transmitting device and each wavelength light included in the C-band wavelength-multiplexed signal light stream S2c output from the transmitting device. For the path setting of the node #1, the CH allocator 801 determines, based on the results of the detection by the CH allocator 801, wavelengths of wavelength light to be input to the output-side WSSs 26a and 26b. The CH allocator 801 is an example of a determination processing section.

The CH setting notifier 802 is an example of a notifier and notifies, to the transmitting devices of the nodes, CH setting information of the CH setting DBs 831 in which results of the channel allocation by the CH allocator 801 have been reflected. In the transmitting devices, the setting processing sections 1 and 4 set wavelengths in the ports of the WSSs based on the CH setting information.

The CH allocator 801 detects a channel able to be allocated when the wavelength band of the wavelength-multiplexed signal light streams S1a and S1b is converted from the L-band to the C-band, for example. In this case, the CH allocator 801 calculates wavelengths after the conversion in accordance with a conversion method indicated by the wavelength conversion information 832. The wavelength conversion information 832 indicates any of a wavelength conversion method by degenerate four-wave mixing and a wavelength conversion method by non-degenerate four-wave mixing.

FIG. 9 is a spectrum diagram illustrating an example of a wavelength conversion method Ga by degenerate four-wave mixing and a wavelength conversion method Gb by non-degenerate four-wave mixing.

When the wavelength conversion information 832 indicates the wavelength conversion method Ga by degenerate four-wave mixing, a certain wavelength is converted into another wavelength that is symmetric about a central wavelength $\lambda c$ of excitation light with respect to the certain wavelength. For example, a wavelength $\lambda c-\Delta\lambda$ in the C-band is converted into a wavelength $\lambda c+\Delta\lambda$ in the L-band. Thus, channels CH #1 to CH # n (n is a positive integer) of the L-band are arranged symmetric about the central wavelength $\lambda c$ of the excitation light with respect to channels of the C-band.

When the wavelength conversion information 832 indicates the wavelength conversion method Gb by non-degenerate four-wave mixing, a certain wavelength is converted into another wavelength that is different by a difference from the central wavelength $\lambda c$ of the excitation light from a central wavelength $\lambda c'$ of other excitation light. For example, the wavelength $\lambda c-\Delta\lambda$ in the C-band is converted into a wavelength $\lambda c'-\Delta\lambda$ in the i-band. Thus, the channels CH #1 to CH # n of the L-band are arranged symmetric about the central wavelength $\lambda c$ of the excitation light, while the channels of the C-band are arranged symmetric about the central wavelength $\lambda c'$ of the excitation light.

Figure 10:
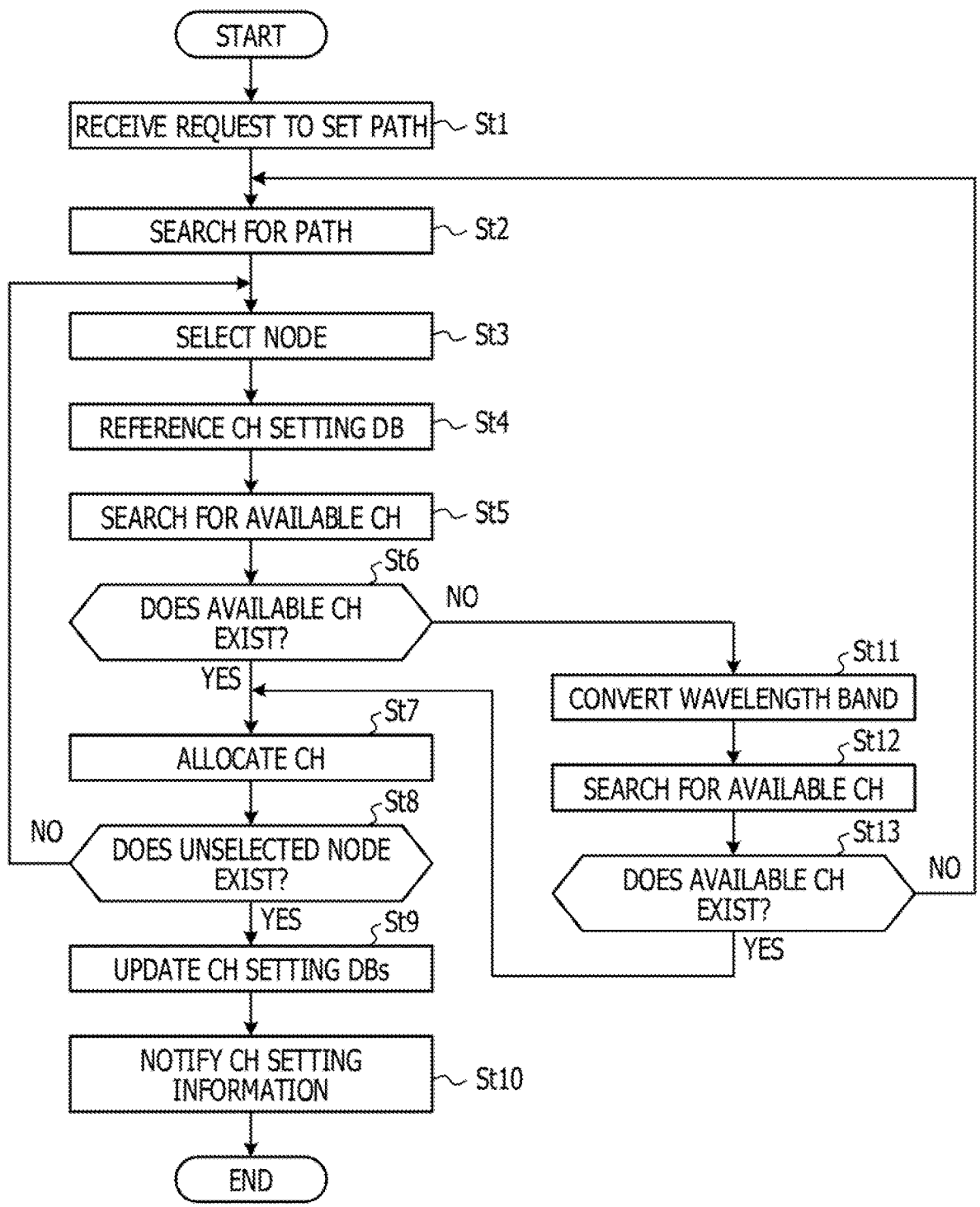
FIG. 10 is a flowchart illustrating an example of a process of allocating channels.

FIG. 10 is a flowchart illustrating an example of a process of allocating channels. The path searcher 800 receives a request to set a path from the user IF 85 (in step St1). The request to set the path includes a start node and end node of the path specified by the user and the number of wavelengths of wavelength light to be transmitted via the path.

Then, the path searcher 800 searches for the path extending from the start node to the end node based on the network configuration DB 830 in accordance with, for example, Dijkstra's algorithm (in step St2). In the example illustrated in FIG. 2, the path searcher 800 searches for the nodes #4, #1, #5, and #8 through which the path Pb extends.

Then, the CH allocator 801 selects one of the nodes of the path (in step St3). The CH allocator 801 references a CH setting DB 831 for the selected node (in step St4). The CH allocator 801 compares, based on the CH setting DB 831, channels for wavelength-multiplexed signal light streams in the same wavelength band with each other and searches for an available channel (CH) for containing each wavelength light targeted for the path setting (in step St5).

The CH allocator 801 determines whether the available channel exists from the search result (in step St6). When the available channel does not exist (No in step St6), the CH allocator 801 converts, in accordance with the wavelength conversion information 832, the wavelength band of a single wavelength-multiplexed signal light stream among the wavelength-multiplexed signal light streams targeted for the path setting into the other wavelength band (in step St11). Thus, a channel for one of the C- and L-bands is converted into a channel for the other of the C- and L-bands, as illustrated in FIG. 9.

The CH allocator 801 compares, based on the CH setting DB 831, a channel for the wavelength-multiplexed signal light stream in the wavelength band after the conversion with a channel for the other wavelength-multiplexed signal light stream in the same wavelength band and searches for an available channel for containing each wavelength light in the wavelength band after the conversion (in step St12). The CH allocator 801 determines whether the available channel exists from the search result (in step St13). When the available channel does not exist (No in step St13), the path is not able to be set for the node selected and the path searcher 800 searches for another path (in step St2). After that, the processes of steps St3 and later are executed.

When the available channel exists (Yes in step St6 or Yes in step St13), the CH allocator 801 allocates a channel to each wavelength light targeted for the path setting (in step St7). Thus, in the transmitting device of the node #1, wavelength light that is among the wavelength light of the input wavelength-multiplexed signal light streams S1a, S1b, S2a, and S2b and is to be wavelength-multiplexed into the wavelength-multiplexed signal light streams S1c and S2c to be output is determined and wavelengths of the wavelength light to be input to the output-side WSSs 26a and 26b are determined.

Then, the CH allocator 801 determines whether an unselected node exists among the nodes on the path (in step St8). When the unselected node exists (No in step St8), the other node is selected (in step St3) and the processes of steps St4 and later are executed again.

When the unselected node does not exist (Yes in step St8), the CH allocator 801 updates the CH setting DBs 831 in accordance with the results of the channel allocation (in step St9). The CH setting notifier 802 notifies information of the CH setting DBs 831 to the transmitting devices of the nodes on the path via the communication port 84 in accordance with an instruction from the CH allocator 801 (in step St10). In the foregoing manner, the process of allocating channels is executed.

Next, the process of allocating channels is described below using the example illustrated in FIG. 2.

FIG. 11 is a diagram illustrating an example of a CH setting DB 831 for the input port P1in. It is assumed that up to 88 channels are allocated to each of the L- and C-bands. Channels (CHs) allocated to the wavelength-multiplexed signal light streams S1a and S2a in the L- and C-bands are registered in the CH setting DB 831 for the input port P1in.

Channels CH #1 to CH #84 are already allocated to the wavelength-multiplexed signal light stream S2a in the C-band (state="1"), but channels CH #85 to CH #88 are not allocated to the wavelength-multiplexed signal light stream S2a in the C-band (state="0"). All the channels CH #1 to CH #88 are already allocated to the wavelength-multiplexed signal light stream S1a in the L-band.

FIG. 12 is a diagram illustrating an example of a CH setting DB 831 for the input port P21n. Channels (CHs) allocated to the wavelength-multiplexed signal light streams S1b and S2b in the L- and C-bands are registered in the CH setting DB 831 for the input port P2in. All the channels CH #1 to CH #88 are already allocated to each of the wavelength-multiplexed signal light streams S1b and S2b in the L- and C-bands.

The CH allocator 801 compares the CH setting DBs 831 for the input ports P1in and P2in with each other and detects overlapping (refer to a dotted frame) of the channels CH #85 to CH #88 allocated to the wavelength-multiplexed signal light streams S1a and S1b. Thus, the CH allocator 801 converts the channels CH #85 to #88 allocated to the wavelength-multiplexed signal light stream S1b into channels CH #85 to CH #88 for the C-band. It is assumed that the CH allocator 801 converts the channels in accordance with the wavelength conversion method by non-degenerate four-wave mixing.

Since the channels CH #85 to CH #88 for the C-band are not allocated based on the CH setting DB 831 for the input port P1in, the CH allocator 801 determines that an available channel able to contain the wavelength-multiplexed signal light stream S1b exists. The CH allocator 801 updates a CH setting DB 831 for the output port P1out in accordance with the determination result.

FIG. 13 illustrates an example of the CH setting DB 831 for the output port P1out. In the CH setting DB 831 for the output port P1out, channels (CHs) allocated to the wavelength-multiplexed signal light streams S1c and S2c in the L- and C-bands are registered.

The channels CH #85 to CH #88 for the wavelength-multiplexed signal light stream S2c in the C-band are already allocated to each wavelength light of the wavelength-multiplexed signal light stream S1b (refer to a dotted frame). CH setting information indicating the foregoing channel settings is notified to the setting processing section 1 of the transmitting device of the node #1 from the CH setting notifier 802. Thus, the wavelength-multiplexed signal light stream S2c may include each wavelength light of the wavelength-multiplexed signal light streams S1b and S2a, while wavelengths do not overlap each other.

(Setting Process by Node #1)

Next, the setting processing section 1 of the transmitting device of the node #1 is described.

Figure 14:
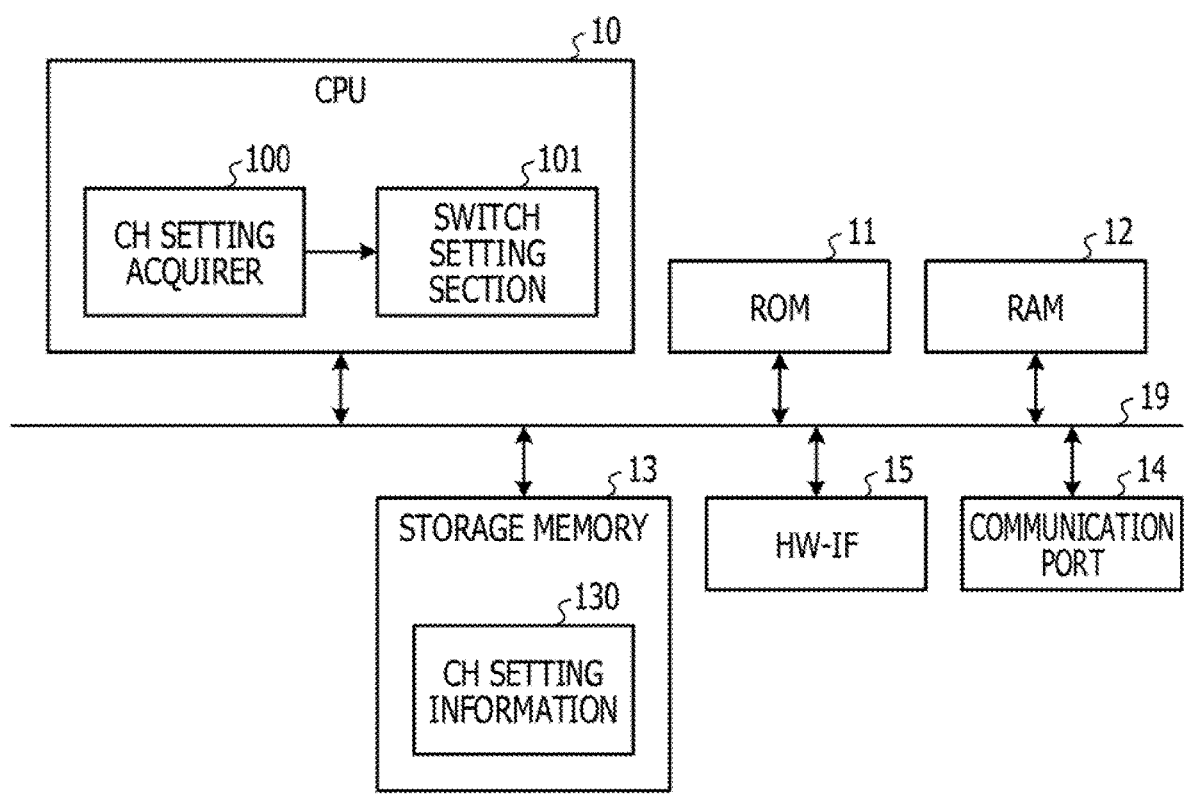
FIG. 14 is a configuration diagram illustrating an example of a setting processing section.

FIG. 14 is a configuration diagram illustrating an example of the setting processing section 1. The setting processing section 1 includes a CPU 10, a ROM 11, a RAM 12, a storage memory 13, a hardware interface (HW-IF) 15, and a communication port 14. The CPU 10 is coupled to the ROM 11, the RAM 12, the storage memory 13, the HW-IF 15, and the communication port 14 via a bus 19 to enable signals to be input and output to and from the CPU 10, the ROM 11, the RAM 12, the storage memory 13, the HW-IF 15, and the communication port 14 via the bus 19.

In the ROM 11, a program for driving the CPU 10 is stored. The RAM 12 functions as a working memory for the CPU 10. The communication port 14 is, for example, a local area network (LAN) port and processes communication between the network monitoring and control device 8 and the CPU 10. The HW-IF 15 is, for example, a circuit such as a field-programmable gate array (FPGA) and relays signals between the CPU 10 and the input-side WSSs 33a and 33b and the output-side WSSs 34a, 34b, 35a, and 35b.

When the CPU 10 reads the program from the ROM 11 to form a channel (CH) setting acquirer 100 and a switch setting section 101 as functions. In the storage memory 13, channel (CH) setting information 130 is stored.

The CH setting acquirer 100 acquires a notification indicating the CH setting information 130 from the network monitoring and control device 8 via the communication port 14. The CH setting acquirer 100 causes the CH setting information 130 to be held in the storage memory 13.

Upon completing the acquisition of the CH setting information 130, the CH setting acquirer 100 notifies the completion of the acquisition to the switch setting section 101. The switch setting section 101 sets the input-side WSSs 24a, 24b, 25a, and 25b and the output-side WSSs 26a and 26b based on the CH setting acquirer 100.

Figure 15:
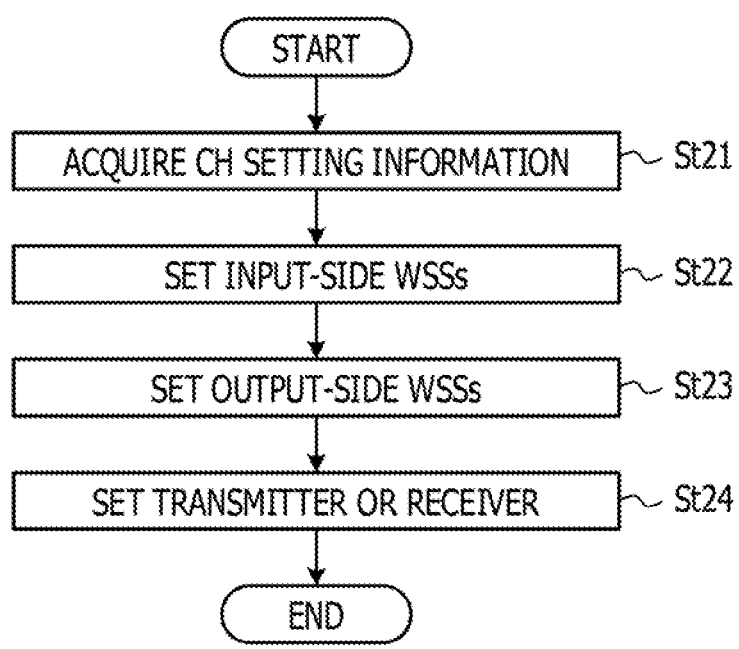
FIG. 15 is a flowchart illustrating an example of a process by the setting processing section.

FIG. 15 is a flowchart illustrating an example of a process by the setting processing section 1. The CH setting acquirer 100 acquires the CH setting information 130 from the network monitoring and control device 8 (in step St21).

Then, the switch setting section 101 sets the input-side WSSs 24a, 24b, 25a, and 25b based on the CH setting information 130 (in step St22) and sets the output-side WSSs 26a and 26b based on the CH setting information 130 (in step St23). For example, the switch setting section 101 sets wavelengths in the ports a of the input-side WSSs 24a and 25a in accordance with the CH setting information 130 of the input port P1in and sets wavelengths in the ports a of the input-side WSSs 24b and 25b in accordance with the CH setting information 130 of the input port P21n. The switch setting section 101 sets wavelengths in the ports b and c of the input-side WSSs 24a, 24b, 25a, and 25b and the ports d to g of the output-side WSSs 26a and 26b in accordance with the CH setting information 130 of the output port Pout.

Then, when the node #1 is the start node or the end node, the switch setting section 101 sets wavelengths in a transmitter Tx or a receiver Rx (in step St24). In the foregoing manner, the setting processing section 1 executes the process.

As described above, the setting processing section 1 sets the wavelengths of each wavelength light to be input to the output-side WSSs 26a and 26b in accordance with the notification from the network monitoring and control device 8. Thus, the wavelength light is included in the wavelength-multiplexed signal light streams S1c and S2c, while wavelengths of the wavelength light do not overlap each other.

(Other Effects Caused by Conversion of Wavelength Band)

As described above, the wavelength converters 21a, 21b, and 28 of the transmitting device of the node #1 convert the wavelength bands of the wavelength-multiplexed signal light streams S1b and S2b into the wavelength bands different from those at the time of the input of the wavelength-multiplexed signal light streams S1b and S2b and transmit the wavelength-multiplexed signal light streams S1b and S2b to the node #5. The wavelength converters 31 and 36b of the transmitting device of the node #5 may restore the wavelength bands of the wavelength-multiplexed signal light streams S1b and S2b to the original wavelength bands.

Thus, the transmitting device of the node #1 may convert the wavelength bands of the wavelength-multiplexed signal light streams S1b and S2b into wavelength bands suitable for the type of an optical fiber of the transmission line 9 between the node #1 and the node #5 and transmit the wavelength-multiplexed signal light streams S1b and S2b.

Figure 16:
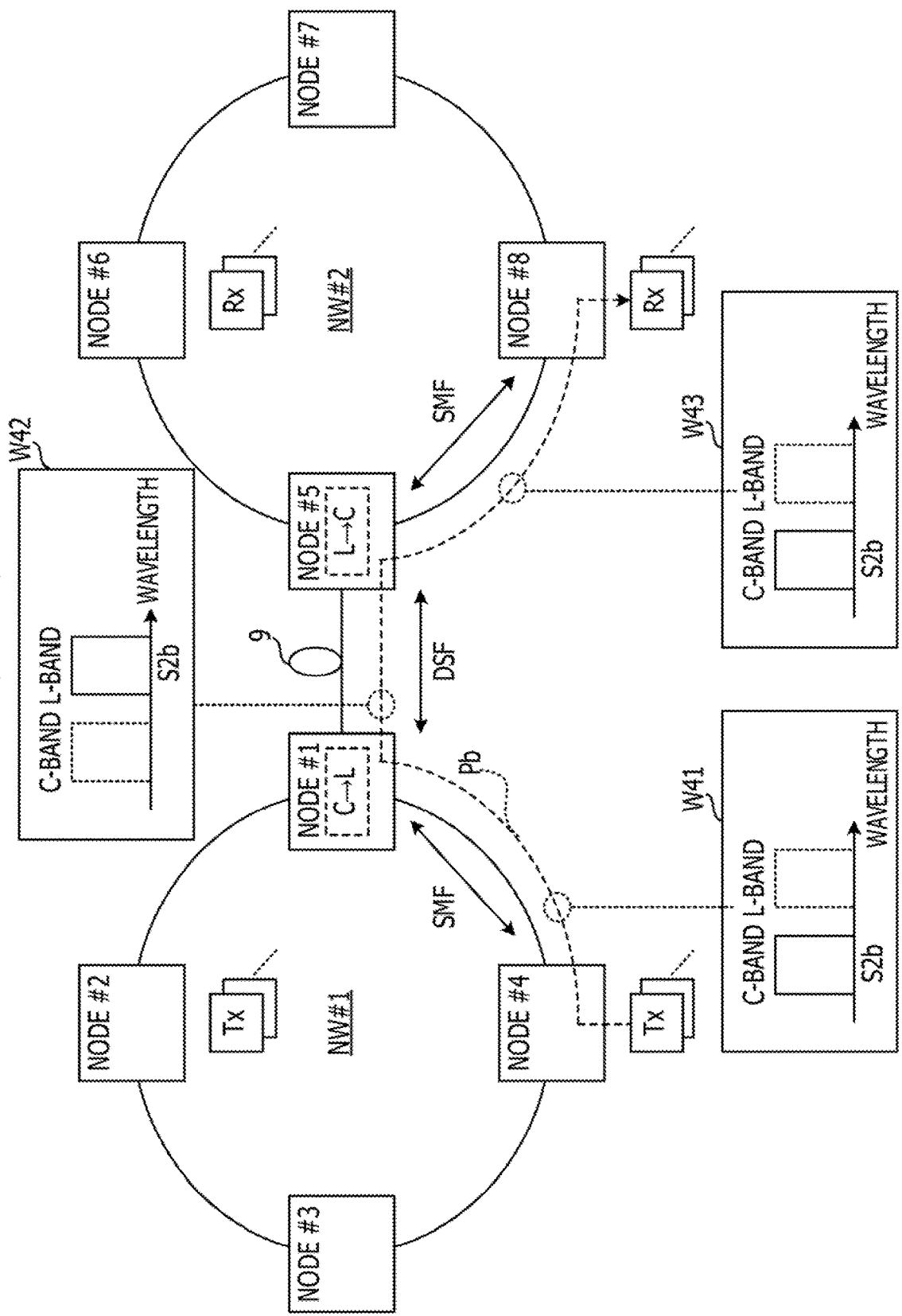
FIG. 16 is a diagram illustrating an example in which a wavelength-multiplexed signal light stream is transmitted in a wavelength band corresponding to the type of an optical fiber.

FIG. 16 is a diagram illustrating an example in which the wavelength-multiplexed signal light stream S2b is transmitted in a wavelength band corresponding to the type of the optical fiber. Configurations illustrated in FIG. 16 and common to those illustrated in FIG. 2 are indicated by the same reference symbols as those illustrated in FIG. 2 and are not described below.

As an example, a single mode fiber (SMF) and a dispersion shift fiber (DSF) exist in the networks NW #1 and NW #2. For example, it is assumed that the nodes #4 and #1 are coupled to each other via an SMF, the nodes #1 and #5 are coupled to each other via a DSF, and the nodes #5 and #8 are coupled to each other via an SMF. The zero-dispersion wavelength is in the C-band in the DSF. Thus, when the wavelength-multiplexed signal light stream S2a in the C-band is transmitted in the DSF between the nodes #1 and #5, a characteristic of the transmission may be degraded due to a non-linear optical effect.

Therefore, the transmitting device of the node #1 converts the wavelength band of the wavelength-multiplexed signal light stream S2b from the C-band to the L-band and transmits the wavelength-multiplexed signal light stream S2b to the DSF (or the transmission line 9). In this case, the line for the wavelength-multiplexed signal light stream S2b within the transmitting device of the node #1 is indicated by the reference symbol R21b in FIG. 6. In this line, the wavelength converter 28 converts the wavelength band of the wavelength-multiplexed signal light stream S2b from the C-band to the L-band.

The transmitting device of the node #5 converts the wavelength band of the wavelength-multiplexed signal light stream S2b from the L-band to the C-band and transmits the wavelength-multiplexed signal light stream S2b to the DSF (or the transmission line 9). In this case, the wavelength converter 31 converts the wavelength band of the wavelength-multiplexed signal light stream S2b from the L-band to the C-band.

A reference symbol W41 indicates an example of the spectrum of the wavelength-multiplexed signal light stream S2b transmitted to the SMF between the nodes #4 and #1. A reference symbol W42 indicates an example of the spectrum of the wavelength-multiplexed signal light stream S2b transmitted to the DSF between the nodes #1 and #5. A reference symbol W43 indicates an example of the spectrum of the wavelength-multiplexed signal light stream S2b transmitted to the SMF between the nodes #5 and #8.

When the wavelength-multiplexed signal light stream S2b is transmitted to the SMFs, the wavelength band of the wavelength-multiplexed signal light stream S2b is the C-band. When the wavelength-multiplexed signal light stream S2b is transmitted to the DSF, the wavelength band of the wavelength-multiplexed signal light stream S2b is the L-band. This suppresses the degradation of the quality of the transmission of the wavelength-multiplexed signal light stream S2b in the DSF between the nodes #1 and #5.

(Addition of Functions of Adding and Dropping Wavelength Light)

The wavelength multiplexer 40 has only a function of causing each wavelength light of the wavelength-multiplexed signal light streams S1a, S2a, S1b, and S2b to pass through the wavelength multiplexer 40, but may have a function of adding wavelength light and a function of dropping wavelength light.

Figure 17:
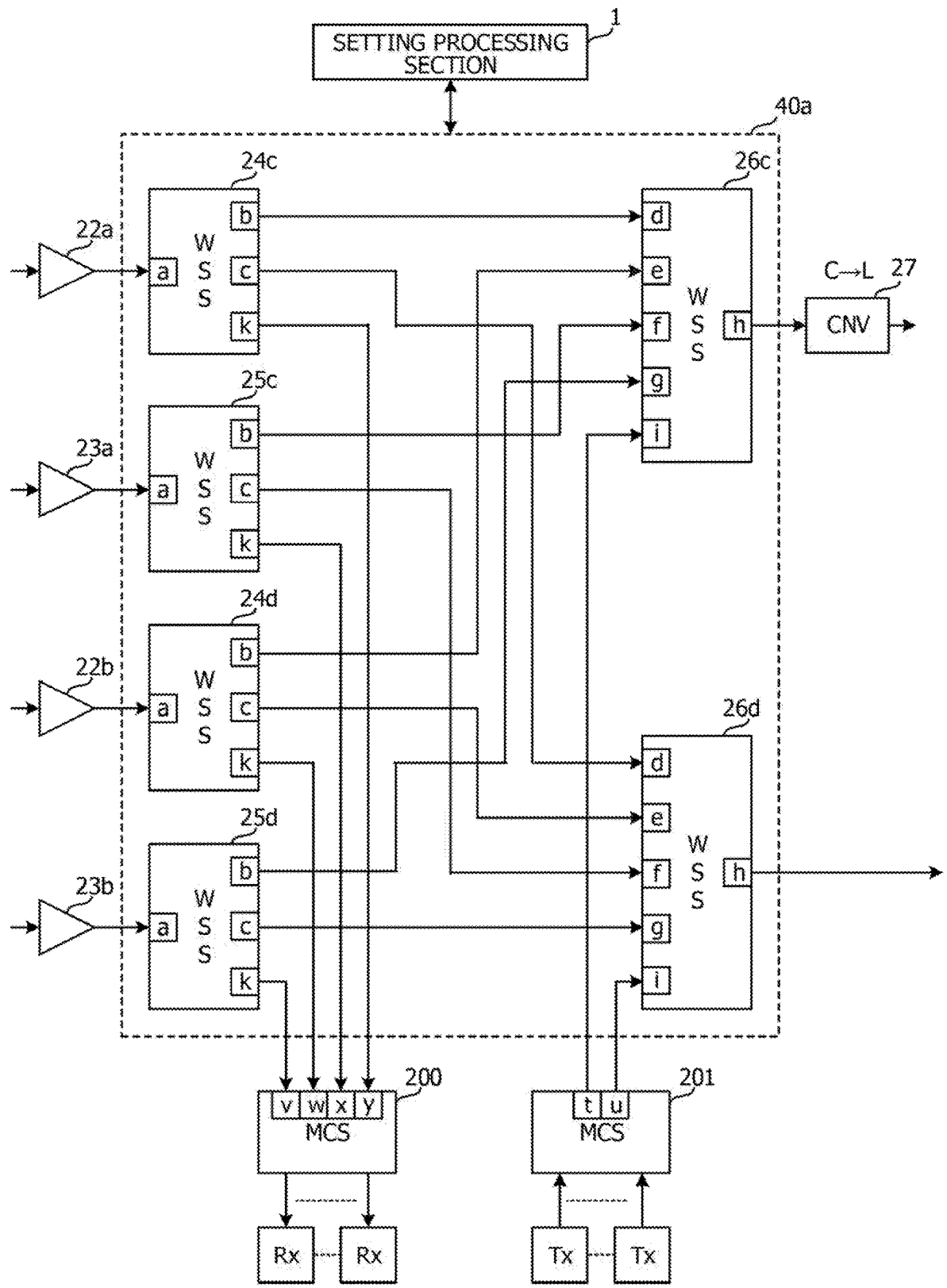
FIG. 17 is a configuration diagram illustrating an example of a wavelength multiplexer having a function of adding wavelength light and a function of dropping wavelength light.

FIG. 17 is a configuration diagram illustrating an example of a wavelength multiplexer 40a having a function of adding wavelength light and a function of dropping wavelength light. The wavelength multiplexer 40a is installed, instead of the wavelength multiplexer 40 illustrated in FIG. 4. FIG. 17 illustrates only the setting processing section 1, the optical amplifiers 22a, 23a, 22b, and 23b, and the wavelength converter 28 among the configurations illustrated in FIG. 4.

The wavelength multiplexer 40a includes input-side WSSs 24c, 24d, 25c, and 25d and output-side WSSs 26c and 26d. Coupling relationships between ports b and c of the input-side WSSs 24c, 24d, 25c, and 25d and ports d to g of the output-side WSSs 26c and 26d are the same as the coupling relationships between the ports b and c illustrated in FIG. 4 and the ports d to g illustrated in FIG. 4. Thus, the wavelength multiplexer 40a includes a through function that is the same as or similar to that of the wavelength multiplexer 40 illustrated in FIG. 4. Coupling destinations of ports a and h of the wavelength multiplexer 40a are the same as those of the ports a and h of the wavelength multiplexer 40.

The input-side WSSs 24c, 24d, 25c, and 25d are obtained by adding ports k, which are coupled to a multicast switch (MCS) 200, to the input-side WSSs 24a, 24b, 25a, and 25b. The MCS 200 couples receivers Rx for receiving wavelength light to be dropped to the wavelength multiplexer 40a.

The MCS 200 has ports v to y coupled to the ports k of the input-side WSSs 24c, 24d, 25c, and 25d. The input-side WSSs 24c, 24d, 25c, and 25d separate wavelength light to be dropped from the wavelength-multiplexed signal light streams S1a, S2a, S1b, and S2b input from the ports a and output the wavelength light from the ports k in accordance with settings of the setting processing section 1. The MCS 200 outputs the wavelength light input from the ports v to y to the receivers Rx corresponding to destinations of the wavelength length.

The output-side WSSs 26c and 26d are obtained by adding ports i, which are coupled to an MCS 201, to the output-side WSSs 26a and 26b. The MCS 201 is installed in or outside the transmitting device and couples the wavelength multiplexer 40a to transmitters Tx for transmitting wavelength light to be added.

The MCS 201 has ports t and u coupled to the ports i of the output-side WSSs 26c and 26d. The MCS 201 outputs wavelength light input from the transmitters Tx and to be added from the ports t and u corresponding to destinations of the wavelength light to be added. The output-side WSSs 26c and 26d wavelength-multiplex the wavelength light input from the ports i with the wavelength-multiplexed signal light streams S1a, S2a, S1b, and S2b.

The setting processing section 1 sets a path in accordance with a coupling configuration database (DB) 131 indicating coupling relationships between the ports b, c, and k of the input-side WSSs 24c, 24d, 25c, and 25d, the ports d to g and i of the output-side WSSs 26a and 26b, the ports v to y of the MCS 200, and the ports t and u of the MCS 201. The coupling configuration DB 131 is, for example, stored in the storage memory 13.

FIG. 18 is a diagram illustrating an example of the coupling configuration DB 131. The coupling configuration DB 131 includes an input-side WSS coupling table 131a, an output-side WSS coupling table 131b, and an MCS coupling table 131c.

The input-side WSS coupling table 131a Indicates coupling destinations of the ports b, c, and k of the input-side WSSs 24c, 24d, 25c, and 25d. In the input-side WSS coupling table 131a, WSS-IDs that are identifiers of the input-side WSSs 24c, 24d, 25c, and 25d, port IDs that are identifiers of the ports b, c, and k of the input-side WSSs 24c, 24d, 25c, and 25d, and coupling destination port IDs that are identifiers of coupling destination ports of the ports b, c, and k of the input-side WSSs 24c, 24d, 25c, and 25d are registered.

As an example, each of the coupling destination port IDs is represented by using a hyphen to couple any of symbols of the output-side WSSs 26c and 26d and the MCS 200 to a symbol of a port. For example, since the port k of the input-side WSS 24c is coupled to the port y of the MCS 200, a coupling destination port ID of the port k of the input-side WSS 24c is represented by (200-y).

The output-side WSS coupling table 131b indicates coupling destination ports of the ports d to g and i of the output-side WSSs 26c and 26d. In the output-side WSS coupling table 131b, WSS-IDs that are identifiers of the output-side WSSs 26c and 26d, port IDs that are identifiers of the ports d to g and i of the output-side WSSs 26c and 26d, and coupling destination port IDs that are identifiers of coupling destination ports of the ports d to g and i of the output-side WSSs 26c and 26d are registered.

As an example, each of the coupling destination port IDs is represented by using a hyphen to couple any of symbols of coupling destinations of the output-side WSSs 26c and 26d or the input-side WSSs 24c, 24d, 25c, and 25d and the MCS 201 to a symbol of a port. For example, since the port i of the output-side WSS 26c is coupled to the port t of the MCS 201, a coupling destination port ID of the port i of the output-side WSS 26c is represented by (201-t).

The MCS coupling table 131c indicates coupling destination ports of the ports v to y of the MCS 200 and the ports t and u of the MCS 201. In the MCS coupling table 131c, MCS-IDs that are identifiers of the MCS 200 and 201, port IDs that are identifiers of the ports t to y, and coupling destination port IDs that are identifiers of coupling destination ports of the ports t to y are registered.

As an example, each of the coupling destination port IDs is represented by using a hyphen to couple any of symbols of coupling destinations of the MCSs 200 and 201 or the input-side WSSs 24c, 24d, 25c, and 25d and the output-side WSSs 26c and 26d to a symbol of a port. For example, since the port u of the MCS 201 is coupled to the port i of the output-side WSS 26d, a coupling destination port ID of the port u is represented by (26d-i).

The input-side WSSs 24c, 24d, 25c, and 25d may be cross-coupled to the output-side WSSs 26c and 26d via the MCSs.

Figure 19:
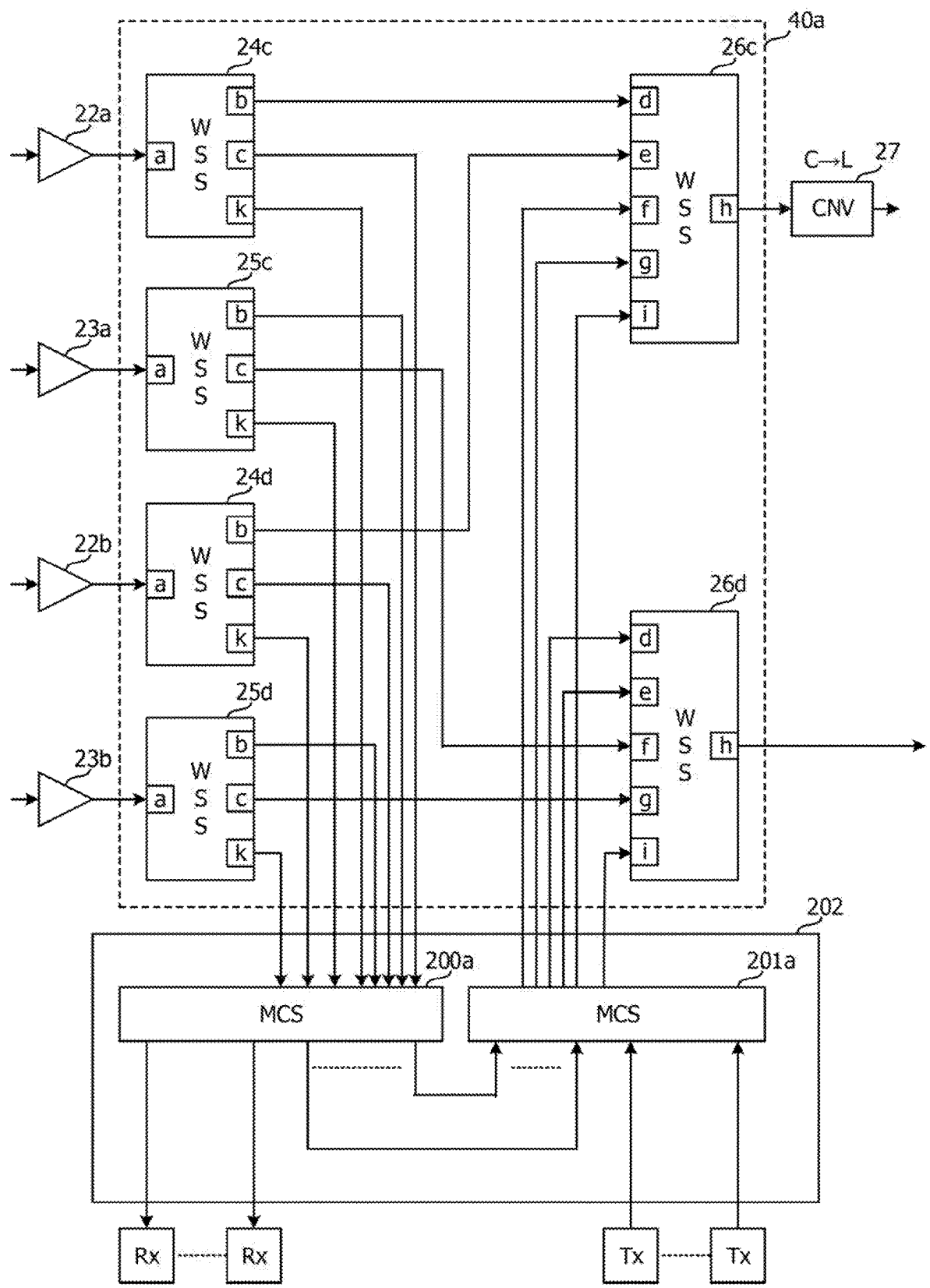
FIG. 19 is a configuration diagram illustrating another example of the wavelength multiplexer having the function of adding wavelength light and the function of dropping wavelength light.

FIG. 19 is a configuration diagram illustrating another example of the wavelength multiplexer 40a having the function of adding wavelength light and the function of dropping wavelength light. Configurations illustrated in FIG. 19 and common to those illustrated in FIG. 17 are indicated by the same reference symbols as those illustrated in FIG. 17 and are not described below.

The wavelength multiplexer 40a is coupled to receivers Rx and transmitters Tx via an optical switch 202 including MCSs 200a and 201a. The optical switch 202 is installed in or outside the transmitting device.

The MCS 200a includes multiple input ports (not illustrated) coupled to the input-side WSSs 24c, 24d, 25c, and 25d, and multiple output ports (not illustrated) coupled to the MSC 201a and the receivers Rx. The MCS 201a includes multiple input ports (not illustrated) coupled to the MCS 200a and the transmitters Tx, and multiple output ports (not illustrated) coupled to the output-side WSSs 26c and 26d.

The ports c of the input-side WSSs 24c and 24d and the ports b of the input-side WSSs 25c and 25d are coupled to the ports f and g of the output-side WSSs 26c and the ports d and e of the output-side WSSs 26d via the MCSs 200a and 201a in accordance with settings of the setting processing section 1. The setting processing section 1 configures the settings so that cross coupling between the input-side WSSs 24c, 24d, 25c, and 25d and the output-side WSSs 26c and 26d is the same as the cross coupling illustrated in FIG. 18.

The setting processing section 1 sets the MCS 200a so that wavelength light input to the MCS 200a from the ports k of the input-side WSSs 24c, 24d, 25c, and 25d and to be dropped is output to the receivers Rx corresponding to destinations of the wavelength light. The setting processing section 1 sets the MCS 201a so that wavelength light input to the MCS 201a from the transmitters Tx and to be added is output to the ports i of the output-side WSSs 26c and 26d.

Thus, the wavelength multiplexer 40a having the function of adding wavelength light and the function of dropping wavelength light may execute wavelength multiplexing in a similar manner to the wavelength multiplexer 40 illustrated in FIG. 4. The optical switch 202 may include wavelength selective switches, instead of the MCSs 200a and 201a. The transmitting device of the node #5 may include a function of adding wavelength light and a function of dropping wavelength light in the case where the MCSs and the like are coupled to the wavelength multiplexer 41 in the foregoing manner.

In the configurations illustrated in FIGS. 17 and 19, each of the transmitters Tx transmits wavelength light in the C-band to the output-side WSSs 26c and 26d. Thus, each of the transmitting devices may add wavelength light output from the transmitters Tx to the wavelength-multiplexed signal light stream S1c output from the output-side WSSs 26c and 26d.

The receivers Rx receive the wavelength light in the C-band from the input-side WSSs 24c, 25c, 24d, and 25d. Thus, the transmitting devices may drop the wavelength light from the wavelength-multiplexed signal light streams S1a, S2a, S1b, and S2b input to the input-side WSSs 24c, 25c, 24d, and 25d.

(Addition of Optical Amplifiers)

When the wavelength bands of the wavelength-multiplexed signal light streams S1a, S2a, S1b, and S2b are converted by the wavelength converters 21a, 21b, and 28, the power of the wavelength-multiplexed signal light streams S1a, S2a, S1b, and S2b may decrease. It is, therefore, preferable to add an optical amplifier for compensating for the decreases in the power.

Figure 20:
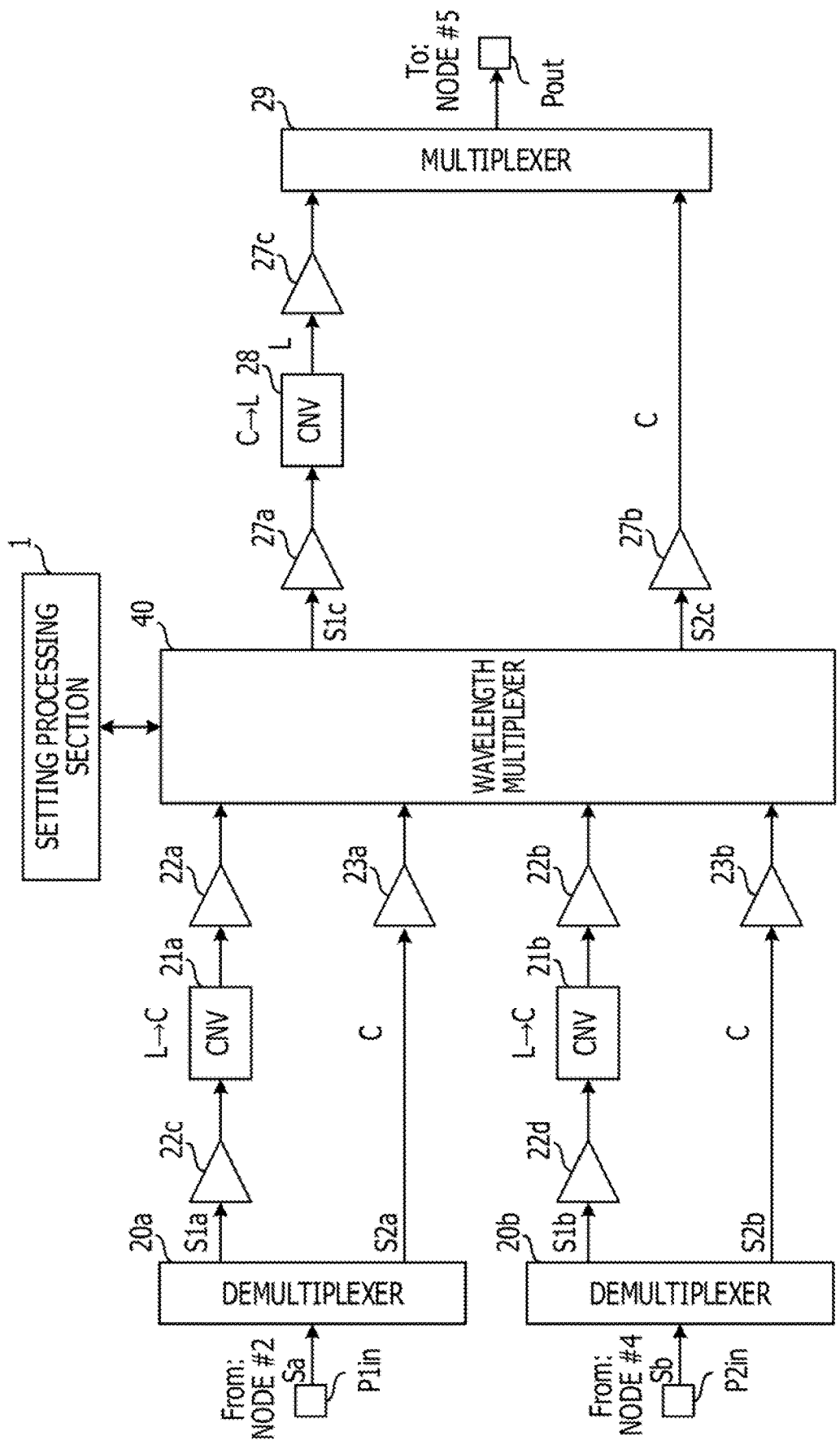
FIG. 20 is a configuration diagram illustrating an example of a transmitting device having optical amplifiers added thereto.

FIG. 20 is a configuration diagram illustrating an example of a transmitting device having optical amplifiers 22c, 22d, and 27c added thereto. Configurations illustrated in FIG. 20 and common to those illustrated in FIG. 4 are indicated by the same reference symbols as those illustrated in FIG. 4 and are not described below.

The optical amplifiers 22c and 22d are installed between the demultiplexers 20a and 20b and the wavelength converters 21a and 21b. The optical amplifiers 22c and 22d amplify the wavelength-multiplexed signal light streams S1a and S1b to be input to the wavelength converters 21a and 21b. This amplification compensates for decreases, caused by the wavelength band conversion by the wavelength converters 21a and 21b, in the power of the wavelength-multiplexed signal light streams S1a and S1b. The optical amplifiers 22c and 22d are an example of a first optical amplifier and a second optical amplifier. The transmitting device may not include both optical amplifiers 22c and 22d and may include one of the optical amplifiers 22c and 22d.

The optical amplifier 27c is installed between the wavelength converter 28 and the multiplexer 29. The optical amplifier 27c amplifies the wavelength-multiplexed signal light stream S1c output from the wavelength converter 28 and to be input to the multiplexer 29. This amplification compensates for a decrease, caused by the wavelength band conversion by the wavelength converter 28, in the power of the wavelength-multiplexed signal light stream S1c. The optical amplifier 27c is an example of a third optical amplifier.

(Transmitting Device of Node #1 According to Second Embodiment)

Figure 21:
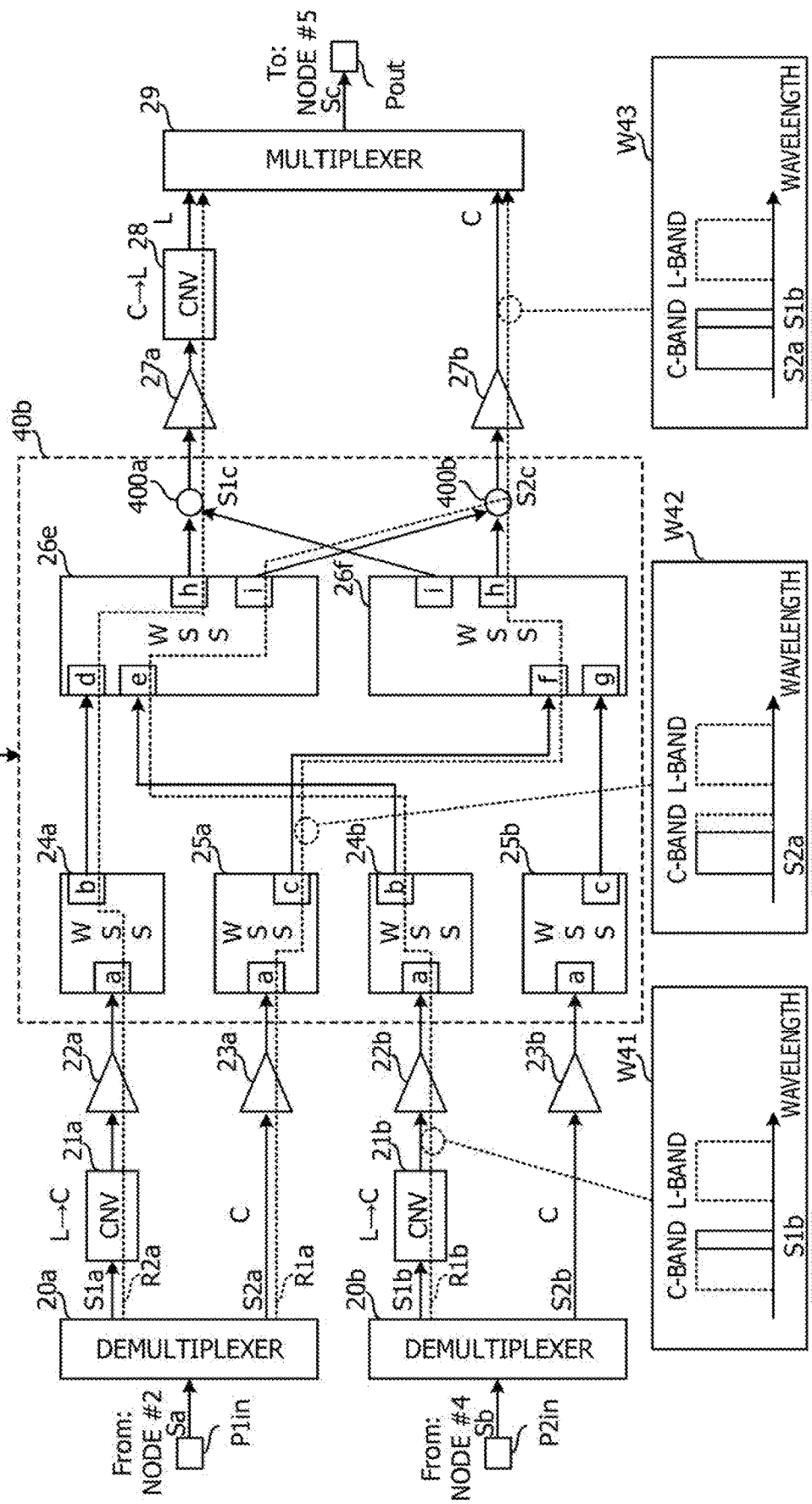
FIG. 21 is a configuration diagram illustrating a transmitting device of a node according to a second embodiment.

FIG. 21 is a configuration diagram illustrating a transmitting device of a node #1 according to a second embodiment. Configurations illustrated in FIG. 21 and common to those illustrated in FIG. 4 are indicated by the same reference symbols as those illustrated in FIG. 4 and are not described below.

In the second embodiment, the transmitting device of the node #1 includes a wavelength multiplexer 40b, instead of the wavelength multiplexer 40. The wavelength multiplexer 40b includes input-side WSSs 24a, 25a, 24b, and 25b, output-side WSSs 26e and 26f, and multiplexers 400a and 400b. The output-side WSSs 26e and 26f are obtained by adding output-side ports i to the output-side WSSs 26a and 26b. Coupling between ports of the input-side WSSs 24a, 25a, 24b, and 25b and ports of the output-side WSSs 26e and 26f is the same as the port coupling illustrated in FIG. 4 and is not described below.

The wavelength-multiplexed signal light stream S1a is input to the output-side WSS 26e from the port d, and the wavelength-multiplexed signal light stream S1b is input the output-side WSS 26e from the port e. The wavelength-multiplexed signal light stream S2a is input to the output-side WSS 26f from the port f, and the wavelength-multiplexed signal light stream S2b is input to the output-side WSS 26f from the port g.

The output-side WSS 26e outputs, from the port h to the multiplexer 400a, the wavelength light included in the wavelength-multiplexed signal light stream S1c among the wavelength light included in the wavelength-multiplexed signal light streams S1a and S1b, and outputs, from the port i to the multiplexer 400b, the wavelength light included in the wavelength-multiplexed signal light stream S2c among the wavelength light included in the wavelength-multiplexed signal light streams S1a and S1b. The output-side WSS 26f outputs, from the port h to the multiplexer 400b, the wavelength light included in the wavelength-multiplexed signal light stream S2c among the wavelength light included in the wavelength-multiplexed signal light streams S2a and S2b, and outputs, from the port i to the multiplexer 400a, the wavelength light included in the wavelength-multiplexed signal light stream S1c among the wavelength light included in the wavelength-multiplexed signal light streams S2a and S2b.

The output-side WSS 26e is an example of a seventh wavelength selective switch. The output-side WSS 26f is an example of an eighth wavelength selective switch. The ports h and i of the output-side WSS 26e are an example of a first port and a second port. The ports i and h of the output-side WSS 26f are an example of a third port and a fourth port.

The multiplexer 400a multiplexes the wavelength light input from the port h of the output-side WSS 26e and the port i of the output-side WSS 26f. The multiplexer 400b multiplexes the wavelength light input from the port i of the output-side WSS 26e and the port h of the output-side WSS 26f. The multiplexer 400a generates the wavelength-multiplexed signal light stream S1c by multiplexing the wavelength light. The multiplexer 400b generates the wavelength-multiplexed signal light stream S2c by multiplexing the wavelength light. The multiplexers 400a and 400b are, for example, optical couplers, but are not limited to this.

Reference symbols W41 to W43 indicate the case where the wavelength-multiplexed signal light stream S2c is generated by wavelength-multiplexing the wavelength-multiplexed signal light stream S1b with the wavelength-multiplexed signal light stream S2a, like the reference symbols W11 to W13 illustrated in FIG. 4. The wavelength-multiplexed signal light stream S1b (reference symbol W41) in the C-band converted is input to the output-side WSS 26e from the input-side WSS 24b and output to the multiplexer 400b from the port i of the output-side WSS 26e. The wavelength-multiplexed signal light stream S2a is input to the output-side WSS 26f from the input-side WSS 25a (reference symbol W42) and output to the multiplexer 400b from the port h of the output-side WSS 26f.

The multiplexer 400b generates the wavelength-multiplexed signal light stream S2c by multiplexing the wavelength-multiplexed signal light streams S1b and S2a input from the output-side WSSs 26e and 26f.

The wavelength-multiplexed signal light stream S1a in the C-band converted is input to the output-side WSS 26e from the input-side WSS 24a and output to the multiplexer 400a from the port h of the output-side WSS 26e. Since any wavelength-multiplexed signal light stream is not input to the multiplexer 400a from the output-side WSS 26f, the multiplexer 400a outputs the wavelength-multiplexed signal light stream S1a as the wavelength-multiplexed signal light stream S1c.

According to the configuration described in this example, the wavelength multiplexer 40b may use the multiplexers 400a and 400b to enable the same function as the wavelength multiplexer 40. The wavelength multiplexer 40b is an example of the generator.

In this example, the wavelength-multiplexed signal light streams S1a and S1b are input to the output-side WSS 26e, and the wavelength-multiplexed signal light streams S2a and S2b are input to the output-side WSS 26f. The output-side WSSs 26e and 26f, however, are not limited to this. Any two of the four wavelength-multiplexed signal light streams S1a, S1b, S2a, and S2b may be input to each of the output-side WSSs 26e and 26f.

(Transmitting Device of Node #1 According to Third Embodiment)

Figure 22:
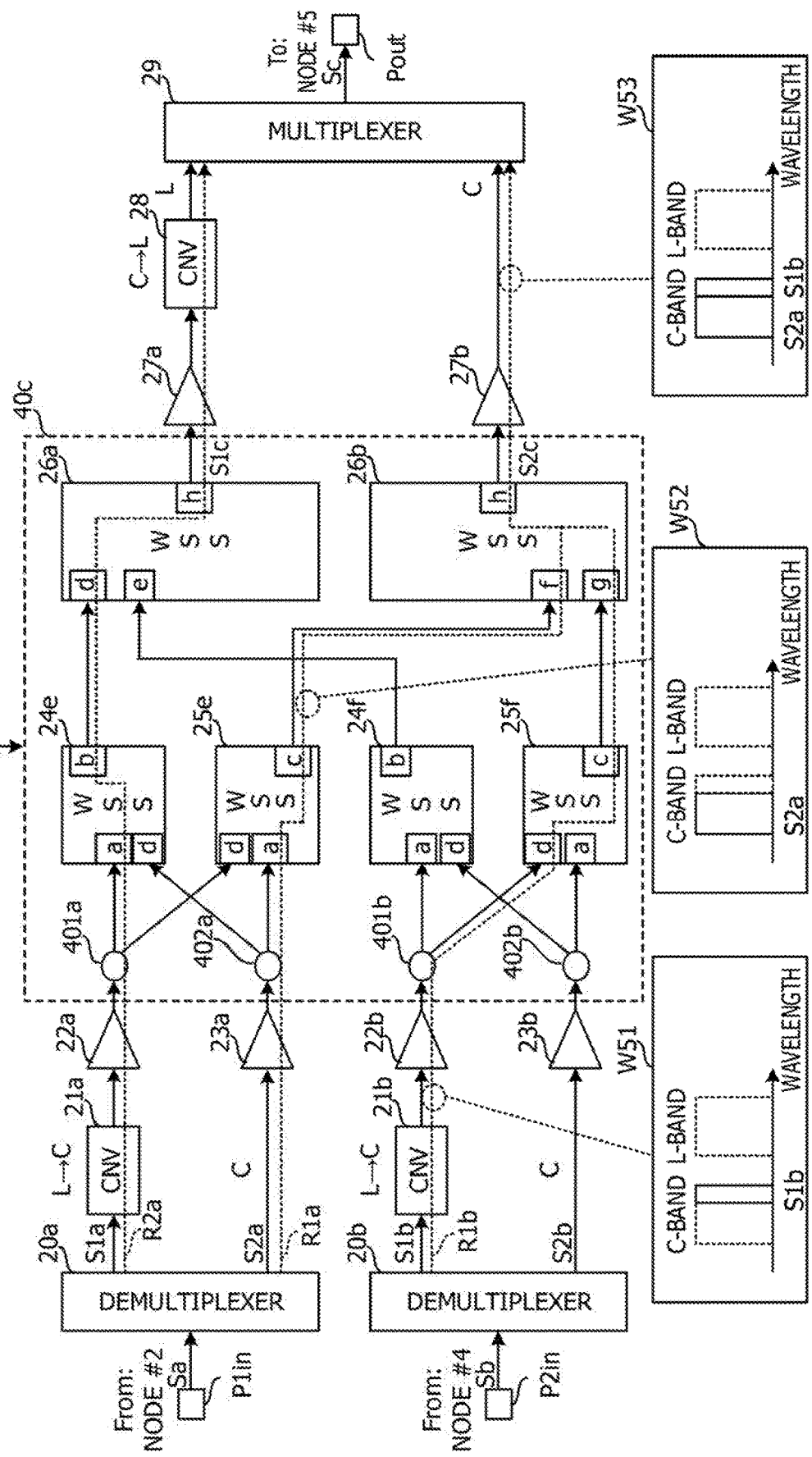
FIG. 22 is a configuration diagram illustrating a transmitting device of a node according to a third embodiment.

FIG. 22 is a configuration diagram illustrating a transmitting device of a node #1 according to a third embodiment. Configurations illustrated in FIG. 22 and common to those illustrated in FIG. 4 are indicated by the same reference symbols as those illustrated in FIG. 4 and are not described below.

In the third embodiment, the transmitting device of the node #1 includes a wavelength multiplexer 40c, instead of the wavelength multiplexer 40. The wavelength multiplexer 40c includes input-side WSSs 24e, 25e, 24f, and 25f, output-side WSSs 26a and 26b, and demultiplexers 401a, 402a, 401b, and 402b. The input-side WSSs 24e, 25e, 24f, and 25f are obtained by adding input-side ports d to the input-side WSSs 24a, 25a, 24b, and 25b. Coupling between ports of the input-side WSSs 24e, 25e, 24f, and 25f and ports of the output-side WSSs 26a and 26b are the same as a part of the port coupling illustrated in FIG. 4 and is not described below.

The demultiplexer 401a is coupled between the optical amplifier 22a and the input-side WSSs 24e and 25e. The demultiplexer 401a demultiplexes the wavelength-multiplexed signal light stream S1a and outputs the demultiplexed wavelength-multiplexed signal light stream S1a to the input-side WSSs 24e and 25e. The demultiplexer 402a is coupled between the optical amplifier 23a and the input-side WSSs 24e and 25e. The demultiplexer 402a demultiplexes the wavelength-multiplexed signal light stream S2a and outputs the demultiplexed wavelength-multiplexed signal light stream S2a to the input-side WSSs 24e and 25e.

The demultiplexer 401b is coupled between the optical amplifier 22b and the input-side WSSs 24f and 25f. The demultiplexer 401b demultiplexes the wavelength-multiplexed signal light stream S1b and outputs the demultiplexed wavelength-multiplexed signal light stream S1b to the input-side WSSs 24f and 25f. The demultiplexer 402b is coupled between the optical amplifier 23b and the input-side WSSs 24f and 25f. The demultiplexer 402b demultiplexes the wavelength-multiplexed signal light stream S2b and outputs the demultiplexed wavelength-multiplexed signal light stream S2b to the input-side WSSs 24f and 25f. The demultiplexers 401a, 402a, 401b, and 402b are, for example, optical splitters, but are not limited to this.

The wavelength-multiplexed signal light stream S1a is input to the input-side WSS 24e from the port a. The wavelength-multiplexed signal light stream S2a is input to the input-side WSS 24e from the port d. The input-side WSS 24e outputs, from the port b to the output-side WSS 26a, the wavelength light included in the wavelength-multiplexed signal light stream Sic among the wavelength light included in the wavelength-multiplexed signal light streams S1a and S2a.

The wavelength-multiplexed signal light stream S1a is input to the input-side WSS 25e from the port d. The wavelength-multiplexed signal light stream S2a is input to the input-side WSS 25e from the port a. The input-side WSS 25e outputs, from the port c to the output-side WSS 26b, the wavelength light included in the wavelength-multiplexed signal light stream S2c among the wavelength light included in the wavelength-multiplexed signal light streams S1a and S2a.

The wavelength-multiplexed signal light stream S1b is input to the input-side WSS 24f from the port a. The wavelength-multiplexed signal light stream S2b is input to the input-side WSS 24f from the port d. The input-side WSS 24f outputs, from the port b to the output-side WSS 26a, the wavelength light included in the wavelength-multiplexed signal light stream Sic among the wavelength light included in the wavelength-multiplexed signal light streams S1b and S2b.

The wavelength-multiplexed signal light stream S1b is input to the input-side WSS 25f from the port d. The wavelength-multiplexed signal light stream S2b is input to the input-side WSS 25f from the port a. The input-side WSS 25f outputs, from the port c to the output-side WSS 26b, the wavelength light included in the wavelength-multiplexed signal light stream S2c among the wavelength light included in the wavelength-multiplexed signal light streams S1b and S2b.

The output-side WSS 26a generates the wavelength-multiplexed signal light stream Sic by wavelength-multiplexing the wavelength light input from the ports d and e. The output-side WSS 26b generates the wavelength-multiplexed signal light stream S2c by wavelength-multiplexing the wavelength light input from the ports f and g.

Reference symbols W51 to W53 indicate the case where the wavelength-multiplexed signal light stream S2c is generated by wavelength-multiplexing the wavelength-multiplexed signal light stream S1b with the wavelength-multiplexed signal light stream S2a, like the case indicated by reference symbols W11 to W13 illustrated in FIG. 4. The wavelength-multiplexed signal light stream S1b (reference symbol W51) in the C-band converted is demultiplexed by the demultiplexer 402b, input to the input-side WSS 25f, and input from the input-side WSS 25f to the output-side WSS 26b. The wavelength-multiplexed signal light stream S2a (reference symbol W52) is demultiplexed by the demultiplexer 402a, input to the input-side WSS 25e, and input from the input-side WSS 25e to the output-side WSS 26b.

The wavelength-multiplexed signal light stream S1a in the C-band converted is demultiplexed by the demultiplexer 401a, input to the input-side WSS 24e, and input from the input-side WSS 24e to the output-side WSS 26a. Since any wavelength-multiplexed signal light stream is not input to the output-side WSS 26a from the input-side WSS 24f, the output-side WSS 26a outputs the wavelength-multiplexed signal light stream S1a as the wavelength-multiplexed signal light stream Sic.

According to the configuration described in this example, the wavelength multiplexer 40c may use the demultiplexers 401a, 402a, 401b, and 402b to enable the same function as the wavelength multiplexer 40. The wavelength multiplexer 40c is an example of the generator.

(Configuration for Multiplexing Wavelength-Multiplexed Signal Light Streams in Three Wavelength Bands)

The embodiments describe the transmitting devices that multiplex the wavelength-multiplexed signal light streams S1a, S2a, S1b, and S2b in the C- and L-bands, but are not limited to this. Each of the transmitting devices may multiplex wavelength-multiplexed signal light streams in the C-, L-, and S-bands.

FIG. 23 is a configuration diagram illustrating an example of a transmitting device for multiplexing wavelength-multiplexed signal light streams in the L-, C-, and S-bands. Although this example describes the transmitting device of the node #1, the transmitting device of the node #5 has a configuration obtained by applying the following configuration to the transmitting device illustrated in FIG. 7.

The transmitting device includes a setting processing section 1a, demultiplexers 50a and 50b, wavelength converters 51a, 51b, 52a, 52b, 65, and 66, optical amplifiers 53a, 54a, 55a, 53b, 54b, 55b, and 62 to 64, a wavelength multiplexer 40d, and a multiplexer 67. Each of the wavelength converters 51a, 51b, 52a, 52b, 65, and 66 has the configuration illustrated in FIG. 3 as an example. The wavelength multiplexer 40d includes input-side WSSs 56a, 57a, 58a, 56b, 57b, and 58b and output-side WSSs 59 to 61.

It is assumed that multiplexed light Sa obtained by multiplexing wavelength-multiplexed signal light streams S1a, S2a, and S3a in the L-, C-, and S-bands is input to the transmitting device of the node #1 from the node #2, and multiplexed light Sb obtained by multiplexing wavelength-multiplexed signal light streams S1b, S2b, and S3b in the L-, C-, and S-bands is input to the transmitting device of the node #1 from the node #4, unlike the example illustrated in FIG. 2.

The demultiplexer 50a demultiplexes the wavelength-multiplexed signal light streams S1a, S2a, and S3a in the L-, C-, and S-bands from the multiplexed light Sa input from the node #2. The demultiplexer 50b demultiplexes the wavelength-multiplexed signal light streams S1b, S2b, and S3b in the L-, C-, and S-bands from the multiplexed light Sb input from the node #4. The demultiplexers 50a and 50b are, for example, optical filters or optical splitters.

The wavelength converters 51a and 51b convert the wavelength band of the wavelength-multiplexed signal light streams S1a and S1b from the L-band to the C-band. The wavelength converters 52a and 52b convert the wavelength band of the wavelength-multiplexed signal light streams S3a and S3b from the S-band to the C-band.

The optical amplifiers 53a, 54a, and 55a amplify the wavelength-multiplexed signal light streams S1a, S2a, and S3a, respectively. The wavelength-multiplexed signal light streams S1a, S2a, and S3a are input to the wavelength multiplexer 40d from the optical amplifiers 53a, 54a, and 55a. The optical amplifiers 53b, 54b, and 55b amplify the wavelength-multiplexed signal light streams S1b, S2b, and S3b, respectively. The wavelength-multiplexed signal light streams S1b, S2b, and S3b are input to the wavelength multiplexer 40d from the optical amplifiers 53b, 54b, and 55b.

In the wavelength multiplexer 40d, the input-side WSSs 56a to 58a and 56b to 58b are cross-coupled to the output-side WSSs 59 to 61. For example, each of the input-side WSSs 56a, 57a, and 58a is coupled to the output-side WSSs 59, 60, and 61.

The wavelength-multiplexed signal light streams S1a, S2a, and S3a are input to the input-side WSSs 56a, 57a, and 58a from the optical amplifiers 53a, 54a, and 55a. The wavelength-multiplexed signal light streams S1b, S2b, and S3b are input to the input-side WSSs 56b, 57b, and 58b from the optical amplifiers 53b, 54b, and 55b.

The setting processing section 1a has the same configuration as that illustrated in FIG. 14 and sets the input-side WSSs 56a to 58a and 56b to 58b and the output-side WSSs 59 to 61. The output-side WSS 59 generates a wavelength-multiplexed signal light stream Sic by wavelength-multiplexing the wavelength-multiplexed signal light stream S1b, S2b, or S3b with the wavelength-multiplexed signal light stream S1a in accordance with settings of the setting processing section 1a. The wavelength-multiplexed signal light stream Sic is output from the output-side WSS 59 to the optical amplifier 62.

The output-side WSS 60 generates a wavelength-multiplexed signal light stream S2c by wavelength-multiplexing the wavelength-multiplexed signal light stream S1b, S2b, or S3b with the wavelength-multiplexed signal light stream S2a in accordance with the settings of the setting processing section 1a. The wavelength-multiplexed signal light stream S2c is output from the output-side WSS 60 to the optical amplifier 63.

The output-side WSS 61 generates a wavelength-multiplexed signal light stream S3c by wavelength-multiplexing the wavelength-multiplexed signal light stream S1b, S2b, or S3b with the wavelength-multiplexed signal light stream S3a in accordance with the settings of the setting processing section 1a. The wavelength-multiplexed signal light stream S3c is output from the output-side WSS 61 to the optical amplifier 64.

The optical amplifiers 62 to 64 amplify the wavelength-multiplexed signal light streams S1c, S2c, and S3c, respectively. The wavelength-multiplexed signal light streams S1c and S3c are input to the wavelength converters 65 and 66, respectively. The wavelength-multiplexed signal light stream S2c is input to the multiplexer 67.

The wavelength converter 65 converts the wavelength band of the wavelength-multiplexed signal light stream Sic from the C-band to the L-band. The wavelength converter 66 converts the wavelength band of the wavelength-multiplexed signal light stream S3c from the C-band to the S-band.

The multiplexer 67 generates multiplexed light Sc by multiplexing the wavelength-multiplexed signal light stream Sic in the L-band, the wavelength-multiplexed signal light stream S2c in the C-band, and the wavelength-multiplexed signal light stream S3c in the S-band. The multiplexed light Sc is output to the transmission line 9.

In the foregoing manner, the wavelength converter 51a converts the wavelength band of the wavelength-multiplexed signal light stream S1a from the L-band to the C-band, and the wavelength converter 52a converts the wavelength band of the wavelength-multiplexed signal light stream S3a from the S-band to the C-band. Since the input-side WSS 57b is cross-coupled to the output-side WSSs 59 to 61, the input-side WSS 57b may select an output destination of the wavelength-multiplexed signal light stream S2b from among the output-side WSSs 59 to 61.

Thus, the output-side WSSs 59 to 61 may wavelength-multiplex the wavelength-multiplexed signal light stream S2b in the C-band with the wavelength-multiplexed signal light streams S1a to S3a for which available slots exist. Therefore, the transmitting device may relay the wavelength-multiplexed signal light stream S2b in accordance with the path Pb.

The wavelength converter 51b converts the wavelength band of the wavelength-multiplexed signal light stream S1b from the L-band to the C-band, and the wavelength converter 52b converts the wavelength band of the wavelength-multiplexed signal light stream S3b from the S-band to the C-band. Since the input-side WSSs 56b and 58b are cross-coupled to the output-side WSSs 59 to 61, the input-side WSSs 56b and 58b may select output destinations of the wavelength-multiplexed signal light streams S1b and S3b from among the output-side WSSs 59 to 61.

Thus, the output-side WSSs 59 to 61 may wavelength-multiplex the wavelength-multiplexed signal light streams S1b and S3b in the L- or S-band with the wavelength-multiplexed signal light streams S1a to S3a for which available slots exist. Therefore, the transmitting device may relay the wavelength-multiplexed signal light streams S1b and S3b in accordance with the path Pb.

Each of the wavelength converters 51a and 52a is an example of a first wavelength converter. Each of the wavelength converters 51b and 52b is an example of a second wavelength converter. Each of the wavelength converters 65 and 66 is an example of a third wavelength converter. The multiplexer 67 is an example of a first multiplexer. The wavelength multiplexer 40d is an example of the generator. The setting processing section 1a is an example of the setting section.

The foregoing embodiments are preferred embodiments of the disclosure. The embodiments, however, are not limited to this and may by variously modified without departing from the gist of the disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmitting device, comprising:
   a first input port configured to input first input signal light obtained by multiplexing a first wavelength-multiplexed signal light stream in a first wavelength band with a second wavelength-multiplexed signal light stream in a second wavelength band is input;
   a second input port configured to input second input signal light obtained by multiplexing a third wavelength-multiplexed signal light stream in the first wavelength band with a fourth wavelength-multiplexed signal light stream in the second wavelength band is input;
   a first wavelength converter configured to convert the wavelength band of the first wavelength-multiplexed signal light stream from the first wavelength band to the second wavelength band;
   a second wavelength converter configured to convert the wavelength band of the third wavelength-multiplexed signal light stream from the first wavelength band to the second wavelength band;
   a generator configured to:
      generate first output signal light by wavelength-multiplexing first multi-wavelength light in the first wavelength band among multi-wavelength light included in the first wavelength-multiplexed signal light stream in the wavelength band converted by the first wavelength converter, the second wavelength-multiplexed signal light stream, the third wavelength-multiplexed signal light stream in the wavelength band converted by the second wavelength converter, and the fourth wavelength-multiplexed signal light stream so that wavelengths do not overlap each other, and
      generate second output signal light by wavelength-multiplexing second multi-wavelength light in the second wavelength band among the multi-wavelength light included in the first wavelength-multiplexed signal light stream in the wavelength band converted by the first wavelength converter, the second wavelength-multiplexed signal light stream, the third wavelength-multiplexed signal light stream in the wavelength band converted by the second wavelength converter, and the fourth wavelength-multiplexed signal light stream so that wavelengths do not overlap each other;
   a third wavelength converter configured to convert the wavelength band of the first output signal light from the second wavelength band to the first wavelength band;
   a first multiplexer configured to generate multiplexed light by multiplexing the first output signal light in the wavelength band converted by the third wavelength converter with the second output signal light; and
   an output port configured to output the multiplexed light.

2. The transmitting device according to claim 1, wherein the generator includes:
   a first wavelength selective switch configured to generate the first output signal light by wavelength-multiplexing the first multi-wavelength light;
   a second wavelength selective switch that generates the second output signal light by wavelength-multiplexing the second multi-wavelength light;
   a third wavelength selective switch that outputs wavelength light included in the first wavelength-multiplexed signal light stream to the first wavelength selective switch or the second wavelength selective switch;
   a fourth wavelength selective switch configured to output wavelength light included in the second wavelength-multiplexed signal light stream to the first wavelength selective switch or the second wavelength selective switch;
   a fifth wavelength selective switch configured to output wavelength light included in the third wavelength-multiplexed signal light stream to the first wavelength selective switch or the second wavelength selective switch; and
   a sixth wavelength selective switch configured to output wavelength light included in the fourth wavelength-multiplexed signal light stream to the first wavelength selective switch or the second wavelength selective switch.

3. The transmitting device according to claim 2, the transmitting device further comprising:
   a transmitter configured to transmit wavelength light of a wavelength in the second wavelength band to the first wavelength selective switch or the second wavelength selective switch.

4. The transmitting device according to claim 2, the transmitting further comprising:
   a receiver configured to receive wavelength light of a wavelength in the second wavelength band from the third wavelength selective switch, the fourth wavelength selective switch, the fifth wavelength selective switch, or the sixth wavelength selective switch.

5. The transmitting device according to claim 1, wherein the generator includes:
   a seventh wavelength selective switch configured to include a first port that outputs the first multi-wavelength light included in one of two wavelength-multiplexed signal light streams among the first, second, third, and fourth wavelength-multiplexed signal light streams, and a second port that outputs the second multi-wavelength light included in the other of the two wavelength-multiplexed signal light streams;
   an eighth wavelength selective switch configured to include a third port that outputs the first multi-wavelength light included in one of the other two wavelength-multiplexed signal light streams among the first, second, third, and fourth wavelength-multiplexed signal light streams, and a fourth port that outputs the second multi-wavelength light included in the other of the other two wavelength-multiplexed signal light streams;
a second multiplexer configured to multiplex the first multi-wavelength light input from the first and third ports; and
a third multiplexer configured to multiplex the second multi-wavelength light input from the second and fourth ports.

6. The transmitting device according to claim 1, wherein the generator includes:
a ninth wavelength selective switch configured to generate the first output signal light by wavelength-multiplexing the first multi-wavelength light;
a tenth wavelength selective switch configured to generate the second output signal light by wavelength-multiplexing the second multi-wavelength light,
a first demultiplexer configured to demultiplex the first wavelength-multiplexed signal light stream;
a second demultiplexer configured to demultiplex the second wavelength-multiplexed signal light stream;
a third demultiplexer configured to demultiplex the third wavelength-multiplexed signal light stream;
a fourth demultiplexer configured to demultiplex the fourth wavelength-multiplexed signal light stream;
an eleventh wavelength selective switch configured to output, to the ninth wavelength selective switch, the first multi-wavelength light included in the first wavelength-multiplexed signal light stream input from the first demultiplexer and the first multi-wavelength light included in the second wavelength-multiplexed signal light stream input from the second demultiplexer;
a twelfth wavelength selective switch configured to output, to the tenth wavelength selective switch, the second multi-wavelength light included in the first wavelength-multiplexed signal light stream input from the first demultiplexer and the second multi-wavelength light included in the second wavelength-multiplexed signal light stream input from the second demultiplexer;
a thirteenth wavelength selective switch configured to output, to the ninth wavelength selective switch, the first multi-wavelength light included in the third wavelength-multiplexed signal light stream input from the third demultiplexer and the first multi-wavelength light included in the fourth wavelength-multiplexed signal light stream input from the fourth demultiplexer; and
a fourteenth wavelength selective switch configured to output, to the tenth wavelength selective switch, the second multi-wavelength light included in the third wavelength-multiplexed signal light stream input from the third demultiplexer and the second multi-wavelength light included in the fourth wavelength-multiplexed signal light stream input from the fourth demultiplexer.

7. The transmitting device according to claim 1, wherein the transmitting further comprising
either or both of a first optical amplifier configured to amplify the first wavelength-multiplexed signal light stream to be input to the first wavelength converter and a second optical amplifier that amplifies the third wavelength-multiplexed signal light stream to be input to the second wavelength converter.

8. The transmitting device according to claim 1, wherein the transmitting further comprising
a third optical amplifier configured to amplify the first output signal light, to be input to the first multiplexer, in the wavelength band converted by the third wavelength converter.

9. A transmission system comprising:
a first transmitting device; and
a second transmitting device coupled to the first transmitting device via a transmission line,
wherein the first transmitting device includes:
a first input port configured to input first input signal light obtained by multiplexing a first wavelength-multiplexed signal light stream in a first wavelength band with a second wavelength-multiplexed signal light stream in a second wavelength band is input;
a second input port configured to input second input signal light obtained by multiplexing a third wavelength-multiplexed signal light stream in the first wavelength band with a fourth wavelength-multiplexed signal light stream in the second wavelength band is input;
a first wavelength converter configured to convert the wavelength band of the first wavelength-multiplexed signal light stream from the first wavelength band to the second wavelength band;
a second wavelength converter configured to convert the wavelength band of the third wavelength-multiplexed signal light stream from the first wavelength band to the second wavelength band;
a generator configured to:
generate first output signal light by wavelength-multiplexing first multi-wavelength light in the first wavelength band among multi-wavelength light included in the first wavelength-multiplexed signal light stream in the wavelength band converted by the first wavelength converter, the second wavelength-multiplexed signal light stream, the third wavelength-multiplexed signal light stream in the wavelength band converted by the second wavelength converter, and the fourth wavelength-multiplexed signal light stream so that wavelengths do not overlap each other, and
generate second output signal light by wavelength-multiplexing second multi-wavelength light in the second wavelength band among the multi-wavelength light included in the first wavelength-multiplexed signal light stream in the wavelength band converted by the first wavelength converter, the second wavelength-multiplexed signal light stream, the third wavelength-multiplexed signal light stream in the wavelength band converted by the second wavelength converter, and the fourth wavelength-multiplexed signal light stream so that wavelengths do not overlap each other;
a third wavelength converter configured to convert the wavelength band of the first output signal light from the second wavelength band to the first wavelength band;
a multiplexer configured to generate multiplexed light by multiplexing the first output signal light in the wavelength band converted by the third wavelength converter with the second output signal light; and
an output port configured to output the multiplexed light, wherein the second transmitting device includes:
- a demultiplexer configured to demultiplex the first output signal light and the second output signal light from the multiplexed light;
- a fourth wavelength converter that converts the wavelength band of the first output signal light from the first wavelength band to the second wavelength band;
- a reproducer configured to reproduce the first, second, third, and fourth wavelength-multiplexed signal light streams from the wavelength light included in the first output signal light in the wavelength band converted by the fourth wavelength converter and the wavelength light included in the second output signal light;
- a fifth wavelength converter configured to convert the wavelength band of the first wavelength-multiplexed signal light stream from the second wavelength band to the first wavelength band;
- a sixth wavelength converter configured to convert the wavelength band of the third wavelength-multiplexed signal light stream from the second wavelength band to the first wavelength band;
- a first reception-side multiplexer configured to generate the first input signal light by multiplexing the first wavelength-multiplexed signal light stream in the wavelength band converted by the fifth wavelength converter with the second wavelength-multiplexed signal light stream; and
- a second reception-side multiplexer configured to generate the second input signal light by multiplexing the third wavelength-multiplexed signal light stream in the wavelength band converted by the fourth wavelength converter with the fourth wavelength-multiplexed signal light stream.

10. A transmission system comprising:
a transmitting device;
a monitoring and control device that monitors and controls the transmitting device,
wherein the transmitting device includes:
- a first input port configured to input first input signal light obtained by multiplexing a first wavelength-multiplexed signal light stream in a first wavelength band with a second wavelength-multiplexed signal light stream in a second wavelength band is input;
- a second input port configured to input second input signal light obtained by multiplexing a third wavelength-multiplexed signal light stream in the first wavelength band with a fourth wavelength-multiplexed signal light stream in the second wavelength band is input;
- a first wavelength converter configured to convert the wavelength band of the first wavelength-multiplexed signal light stream from the first wavelength band to the second wavelength band;
- a second wavelength converter configured to convert the wavelength band of the third wavelength-multiplexed signal light stream from the first wavelength band to the second wavelength band;
- a generator configured to:
  generate first output signal light by wavelength-multiplexing first multi-wavelength light in the first wavelength band among multi-wavelength light included in the first wavelength-multiplexed signal light stream in the wavelength band converted by the first wavelength converter, the second wavelength-multiplexed signal light stream, the third wavelength-multiplexed signal light stream in the wavelength band converted by the second wavelength converter, and the fourth wavelength-multiplexed signal light stream so that wavelengths do not overlap each other, and
  generate second output signal light by wavelength-multiplexing second multi-wavelength light in the second wavelength band among the multi-wavelength light included in the first wavelength-multiplexed signal light stream in the wavelength band converted by the first wavelength converter, the second wavelength-multiplexed signal light stream, the third wavelength-multiplexed signal light stream in the wavelength band converted by the second wavelength converter, and the fourth wavelength-multiplexed signal light stream so that wavelengths do not overlap each other;
- a third wavelength converter configured to convert the wavelength band of the first output signal light from the second wavelength band to the first wavelength band;
- a multiplexer configured to generate multiplexed light by multiplexing the first output signal light in the wavelength band converted by the third wavelength converter with the second output signal light;
- an output port configured to output the multiplexed light; and
- a setting section configured to set wavelengths of the first and second multi-wavelength light in the generator, wherein the monitoring and control device includes:
- a storage section configured to store wavelength information indicating wavelengths of the wavelength light included in the first and third wavelength-multiplexed signal light streams in the first wavelength band and wavelengths of the wavelength light included in the second and fourth wavelength-multiplexed signal light streams in the second wavelength band;
- a determination processing section configured to detect, based on the wavelength information, overlapping of wavelengths of the wavelength light included in the first and third wavelength-multiplexed signal light streams and overlapping of wavelengths of the wavelength light included in the second and fourth wavelength-multiplexed signal light streams and determines wavelengths of the first and second multi-wavelength light to avoid the overlapping of the wavelengths; and
- a notifier configured to notify the wavelengths of the first and second multi-wavelength light to the setting section, wherein the setting section is configured to set the wavelengths of the first and second multi-wavelength light in accordance with the notification from the notifier.

* * * * *